(12) United States Patent
Sun et al.

(10) Patent No.: US 10,367,197 B2
(45) Date of Patent: Jul. 30, 2019

(54) POSITIVE ACTIVE MATERIAL COMPOSITION FOR LITHIUM BATTERY, METHOD OF PREPARING THE SAME, AND LITHIUM BATTERY INCLUDING THE SAME

(71) Applicant: INDUSTRY-UNIVERSITY COOPERATION FOUNDATION HANYANG UNIVERSITY, Seoul (KR)

(72) Inventors: Yang-Kook Sun, Seoul (KR); Byung-Chun Park, Seoul (KR)

(73) Assignee: Industry-University Cooperation Foundation Hanyang University, Seoul (KR)

(*) Notice: Subject to any disclaimer, the term of this patent is extended or adjusted under 35 U.S.C. 154(b) by 666 days.

(21) Appl. No.: 14/492,497

(22) Filed: Sep. 22, 2014

(65) Prior Publication Data

US 2015/0010824 A1    Jan. 8, 2015

Related U.S. Application Data

(63) Continuation-in-part of application No. 12/279,033, filed as application No. PCT/KR2006/005767 on Aug. 11, 2008, now Pat. No. 8,865,348.

(30) Foreign Application Priority Data

Mar. 30, 2006   (KR) .................... 10-2006-0028861

(51) Int. Cl.
H01M 4/36      (2006.01)
H01M 4/525     (2010.01)
(Continued)

(52) U.S. Cl.
CPC ........... H01M 4/366 (2013.01); H01M 4/131 (2013.01); H01M 4/505 (2013.01); H01M 4/525 (2013.01);
(Continued)

(58) Field of Classification Search
CPC ...... H01M 4/366; H01M 4/505; H01M 4/525; H01M 4/131
(Continued)

(56) References Cited

U.S. PATENT DOCUMENTS 6,040,090 A    3/2000  Sunagawa et al.
6,274,273 B1   8/2001  Cho et al.
(Continued)

FOREIGN PATENT DOCUMENTS

EP    0872450 A1    10/1998
EP    0918041 A1    5/1999
(Continued)

OTHER PUBLICATIONS

Z. Chen, J.R. Dahn; *Studies of LiCoO$_2$ Coated with Metal Oxides*; Electrochemical and Solid State Letters; 2003; pp. A221-A224; vol. 6.
(Continued)

*Primary Examiner* — Osei K Amponsah
(74) *Attorney, Agent, or Firm* — Sughrue Mion, PLLC

(57) ABSTRACT

The present invention relates to a positive active material for a lithium battery, a method of preparing the same, and a lithium battery including the same. More particularly, the present invention relates to a positive active material having excellent high-capacity and thermal stability, a method of preparing the same, and a lithium battery including the same.

8 Claims, 17 Drawing Sheets

(51) Int. Cl.
*H01M 4/131* (2010.01)
*H01M 4/505* (2010.01)
*H01M 10/052* (2010.01)
*H01M 4/02* (2006.01)
*C01G 53/00* (2006.01)

(52) U.S. Cl.
CPC .......... *C01G 53/50* (2013.01); *C01P 2002/52* (2013.01); *C01P 2002/72* (2013.01); *C01P 2002/88* (2013.01); *C01P 2004/03* (2013.01); *C01P 2004/32* (2013.01); *C01P 2006/40* (2013.01); *H01M 10/052* (2013.01); *H01M 2004/021* (2013.01)

(58) Field of Classification Search
USPC .................................................. 429/209, 223
See application file for complete search history.

(56) References Cited

U.S. PATENT DOCUMENTS

| | | | |
|---|---|---|---|
| 6,555,269 | B2 | 4/2003 | Cho et al. |
| 2001/0016285 | A1 | 8/2001 | Cho et al. |
| 2003/0087155 | A1 | 5/2003 | Cho et al. |
| 2003/0180615 | A1* | 9/2003 | Johnson ............. C01G 45/1242 429/231.1 |
| 2004/0096743 | A1 | 5/2004 | Okae et al. |
| 2006/0105239 | A1* | 5/2006 | Paulsen ................. H01M 4/131 429/231.3 |
| 2007/0122705 | A1* | 5/2007 | Paulsen ............... C01G 45/1228 429/231.3 |

FOREIGN PATENT DOCUMENTS

| | | |
|---|---|---|
| JP | 07-235292 A | 9/1995 |
| JP | 1996171910 A | 7/1996 |
| JP | 2000227858 A | 8/2000 |
| JP | 2002001724 A | 1/2002 |
| JP | 2002201028 A | 7/2002 |
| JP | 2003059490 A | 2/2003 |
| JP | 2003068299 A | 3/2003 |
| JP | 2003086182 A | 3/2003 |
| JP | 2003197256 A | 7/2003 |
| JP | 2003203633 A | 7/2003 |
| JP | 2003238165 | 8/2003 |
| JP | 2003242976 A | 8/2003 |
| JP | 2004-87299 A | 3/2004 |
| JP | 2007-213866 A | 8/2007 |
| KR | 1020010081181 A | 8/2001 |
| KR | 1020030033716 A | 5/2003 |
| KR | 1020040007356 A | 1/2004 |
| KR | 1020040095837 A | 11/2004 |
| KR | 1020050083869 A | 8/2005 |
| KR | 577240 | 3/2006 |
| WO | WO 2004/040677 | 5/2004 |
| WO | WO 2004/040677 A1 | 5/2004 |

OTHER PUBLICATIONS

J. Cho, Y.J. Kim, T-J. Kim, B. Park; *Effect of $Al_2O_5$-Coated o-$LiMnO_2$ Cathodes Prepared at Various Temperatures on the 55° C. Cycling Behavior*; Journal of the Electrochemical Society; 2002; pp. A127-A132; vol. 149.

PCT International Search Report; PCT/KR2006/005767; dated Apr. 2007; 8 pages.

J R. Dahn, E.W. Fuller, M. Obrovac, U. von Slaken; Thermal Stability of $Li_xCoO_2$, $Li_xNiO_2$, and $\lambda$-$MnO_2$ and consequences for the safety of Li-ion cells'. Solid State Ionics 69; 1994; pp. 265-270.

T. Ohzuku, A. Ueda, N. Yamamoto; Zero-Strain Insertion Material of $Li[Li_{1/3}Ti_{5/3}]O_4$ for Rechargeable Lithium Cells; J. Electrochem. Soc.; May 1995; pp. 1431-1435; vol. 142, No. 5.

S-H. Kang, J. Kim, M.E. Stoll, D. Abraham, Y.K. Sun, K. Amine; Layered $Li(Ni_{0.5-x}Mn_{0.5-x}M'_{2x})O_2$ (M' = Co, Al, Ti; X = 0, 0.025) cathode materials for Li-ion rechargeable batteries; Journal of Power Sources; 2002; pp. 41-48; vol. 12.

* cited by examiner

[FIG 1]
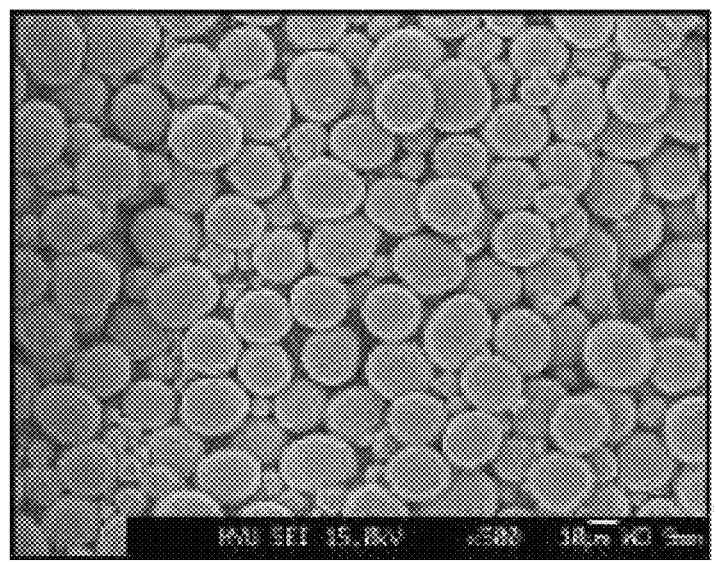

[FIG 2]
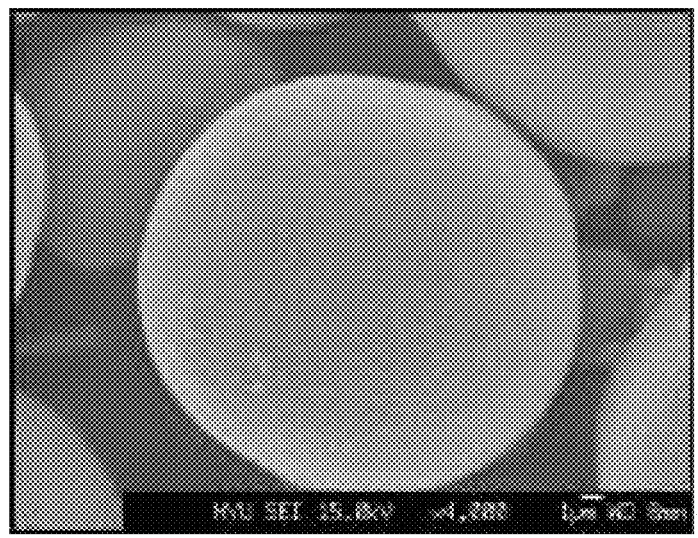

[FIG 3]
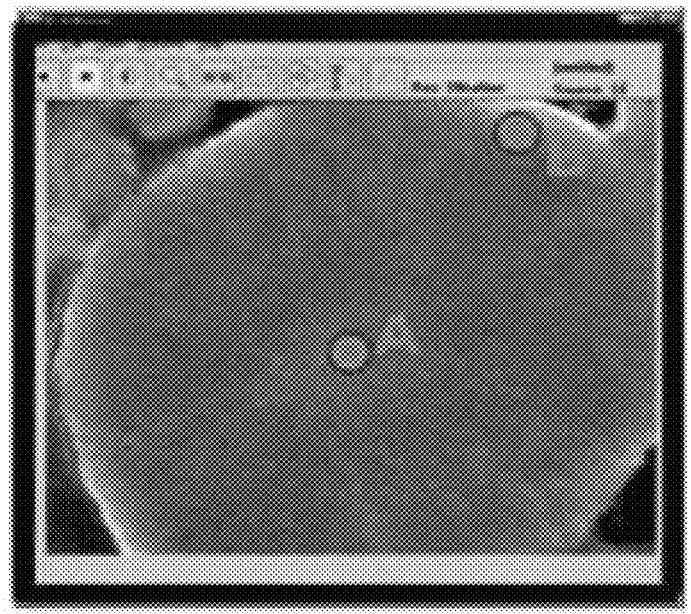

[FIG 4]
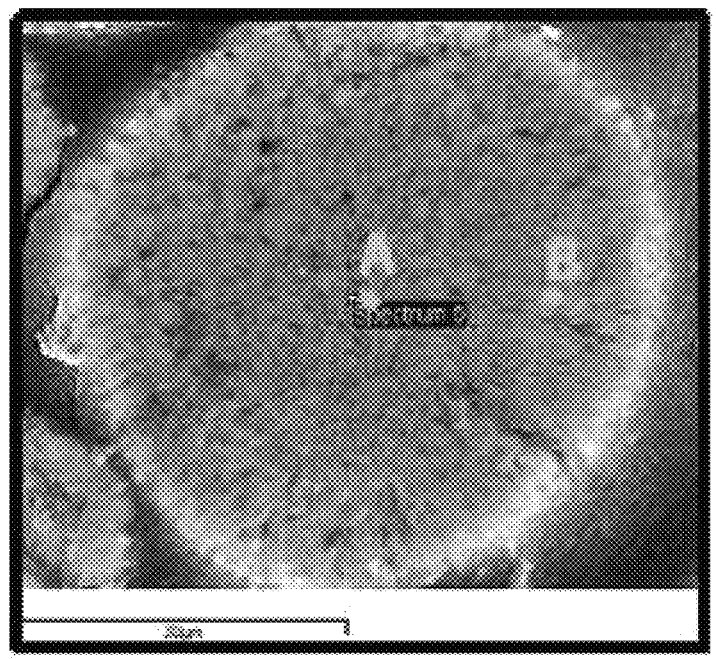

[FIG 5]
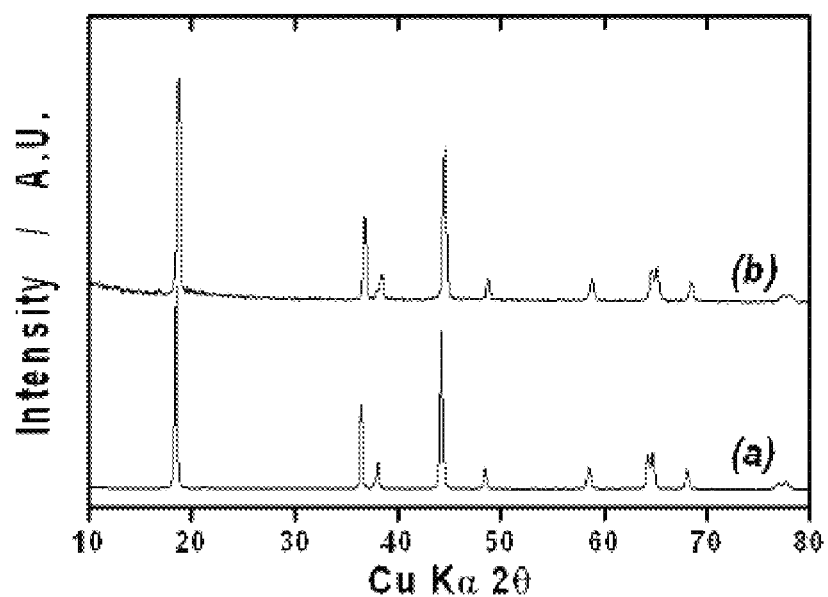

[FIG 6]
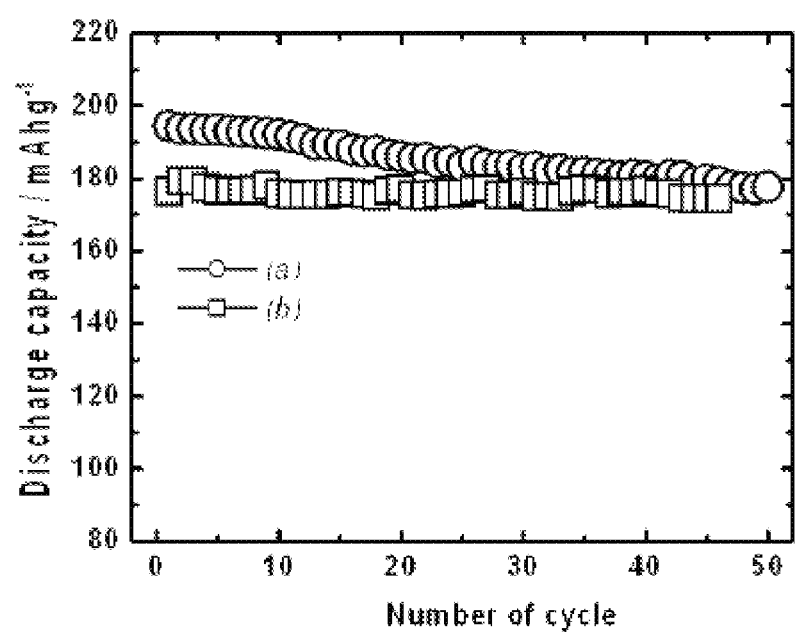

[FIG 7]
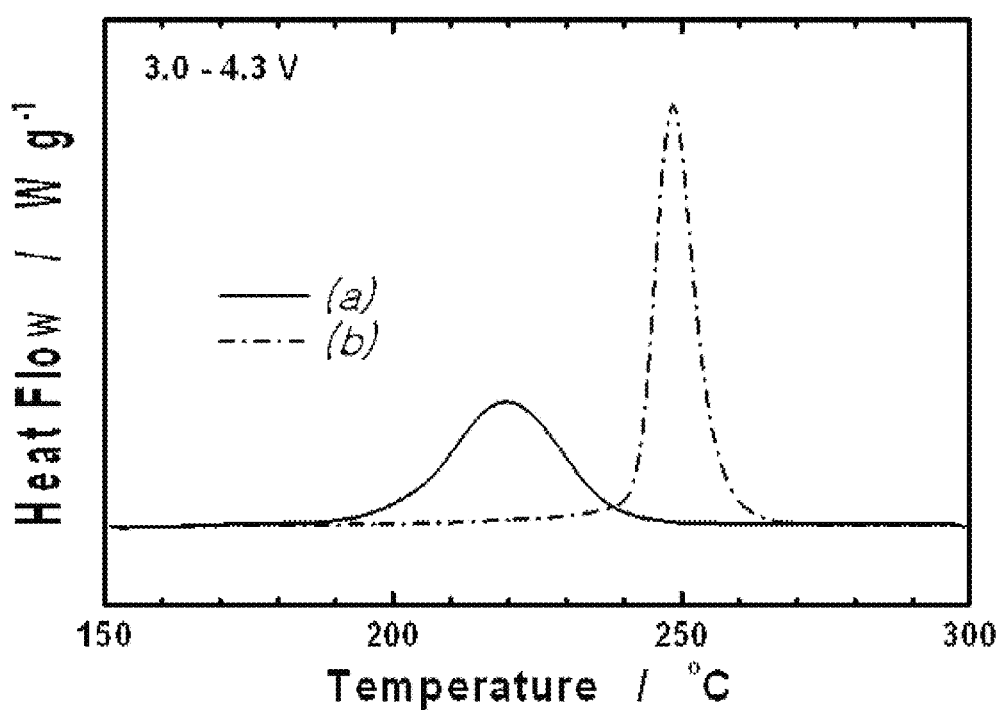

[FIG 8]
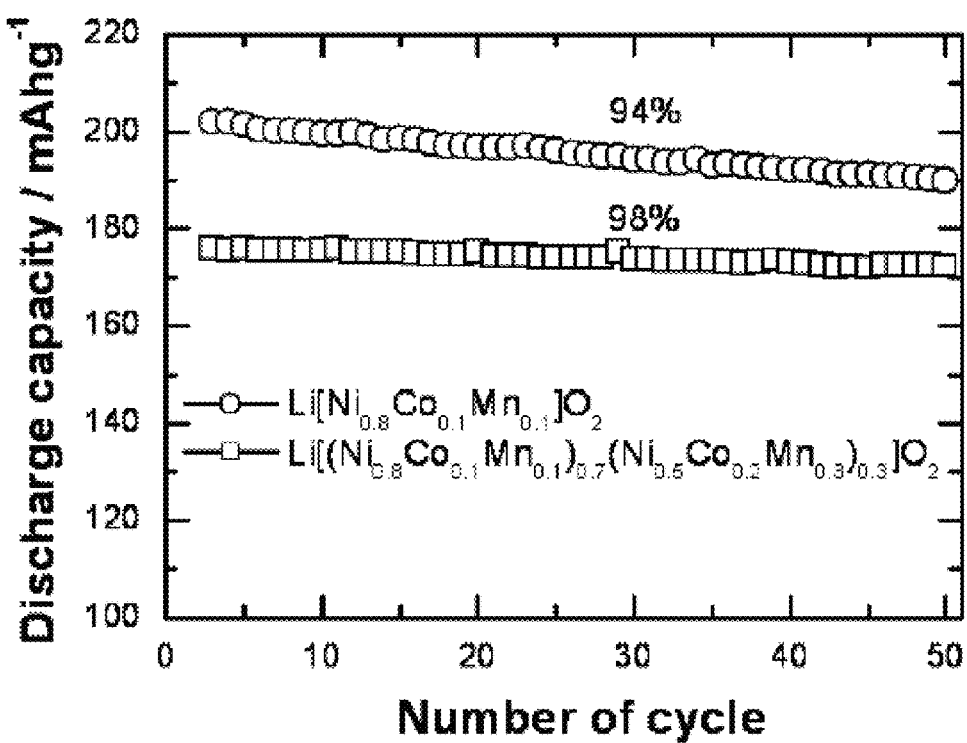

[FIG 9]
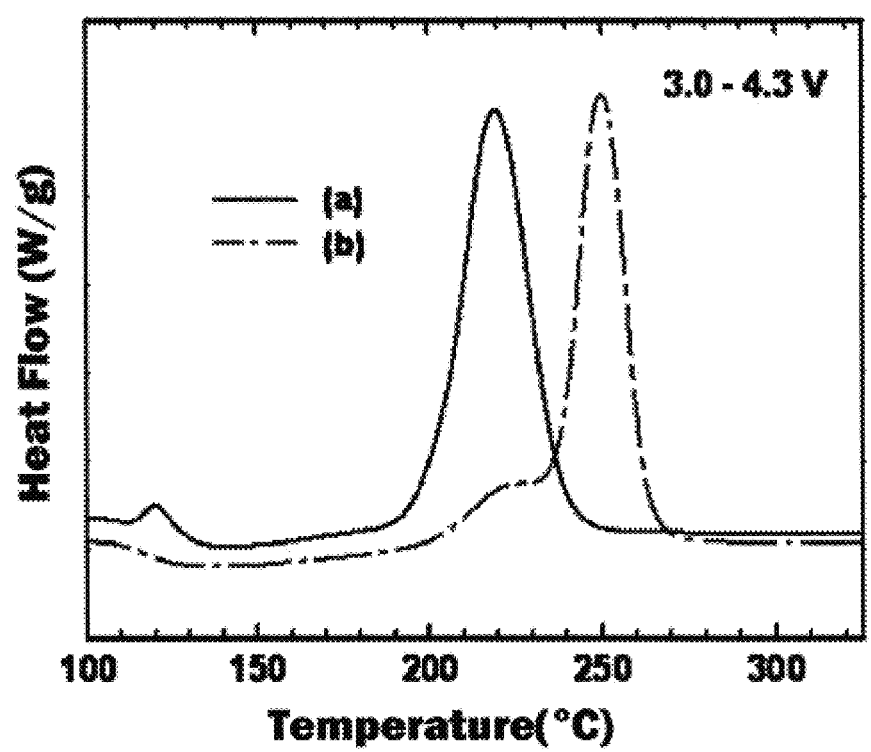

[FIG 10]
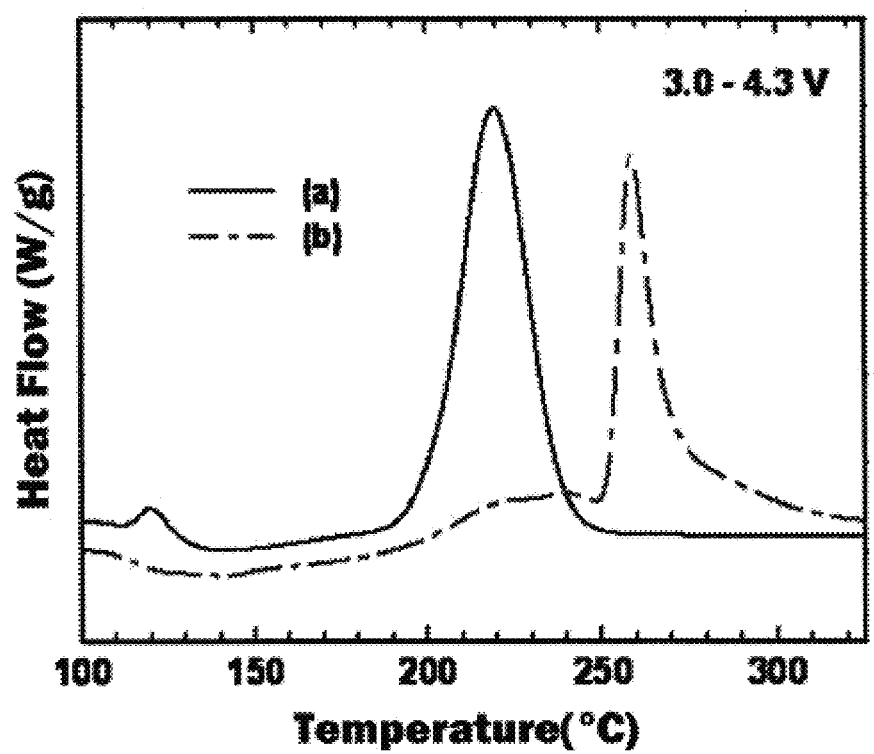

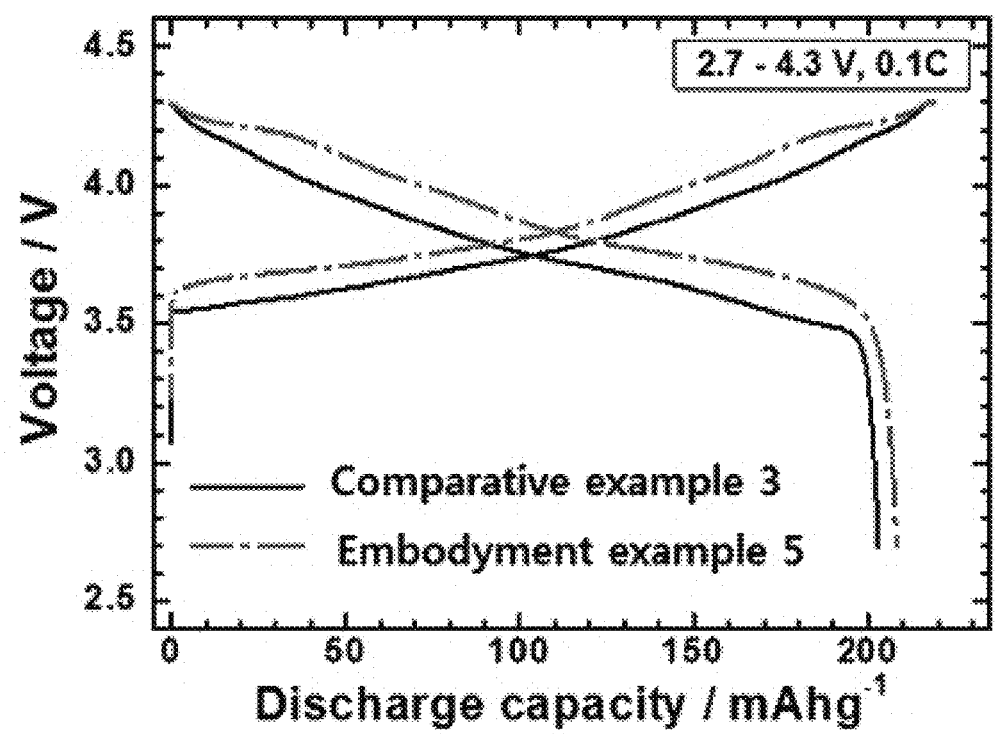
[FIG 11]

[FIG 12]
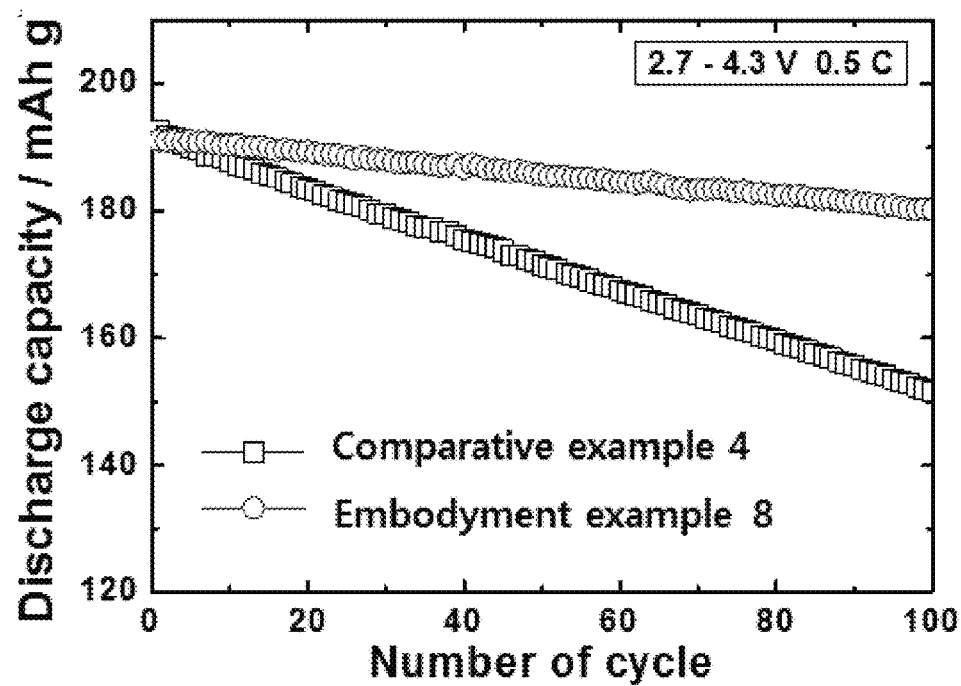

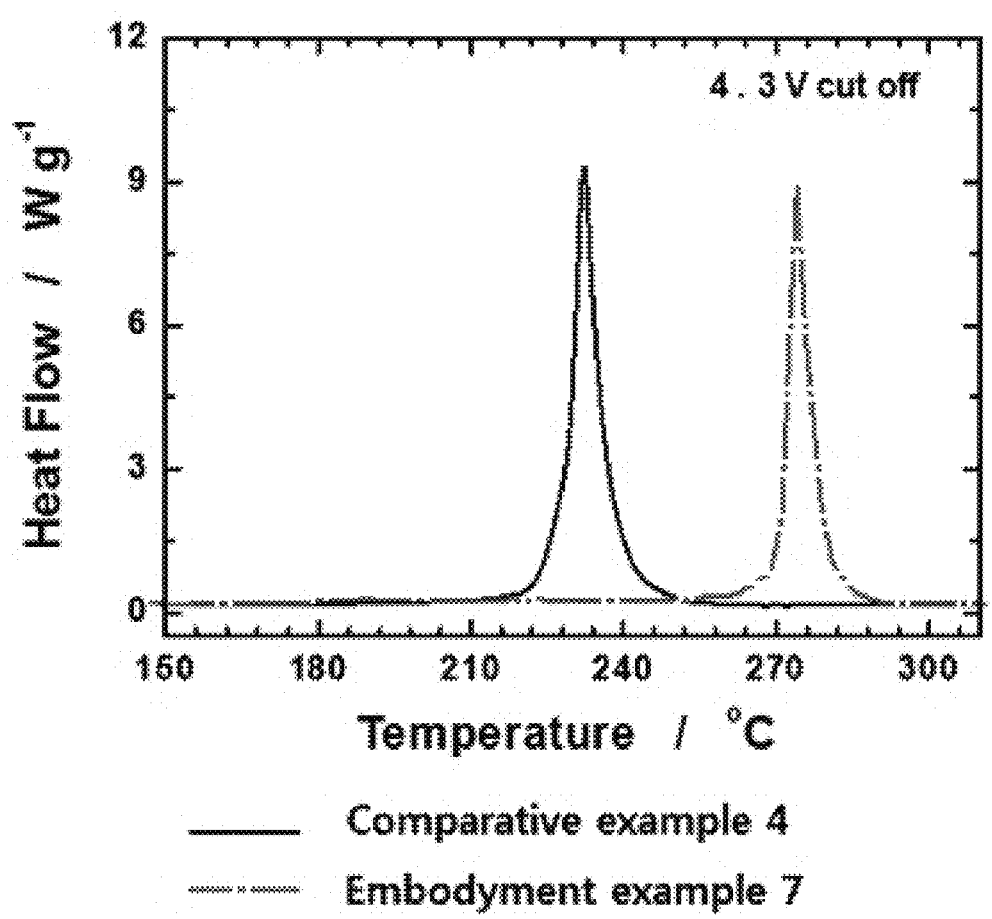
[FIG 13]

[FIG 14]
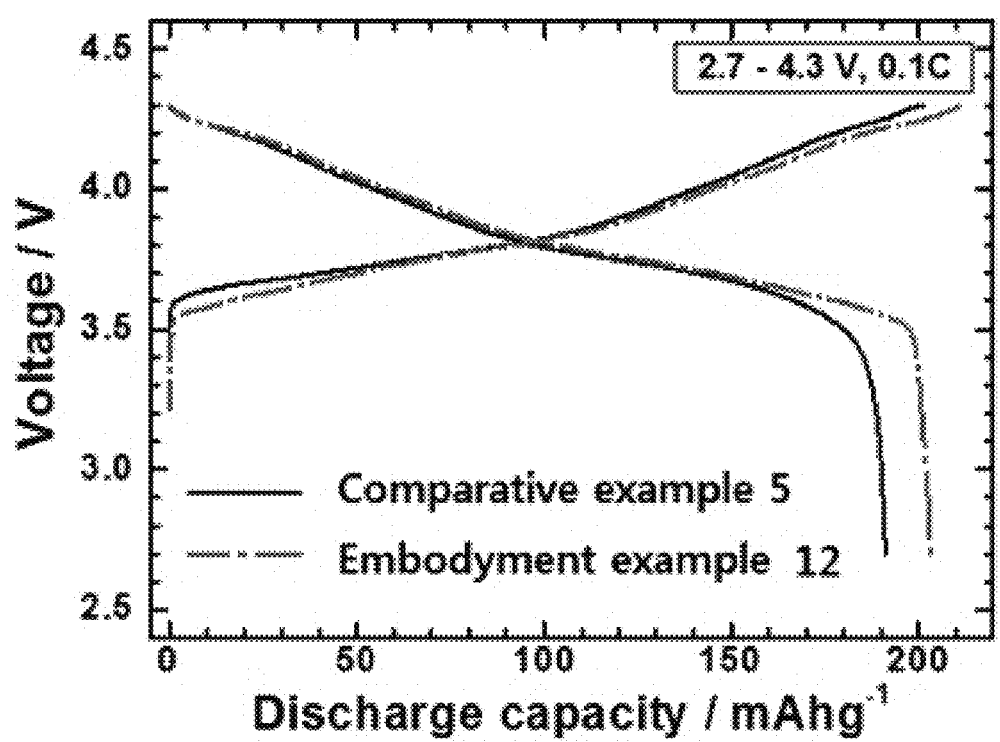

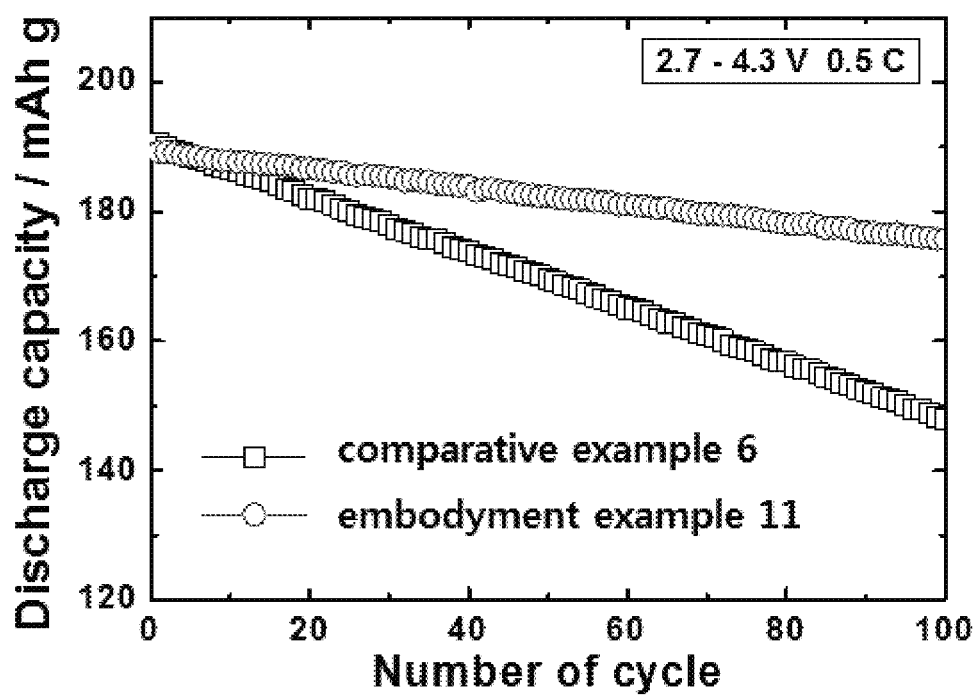
[FIG 15]

[FIG 16]
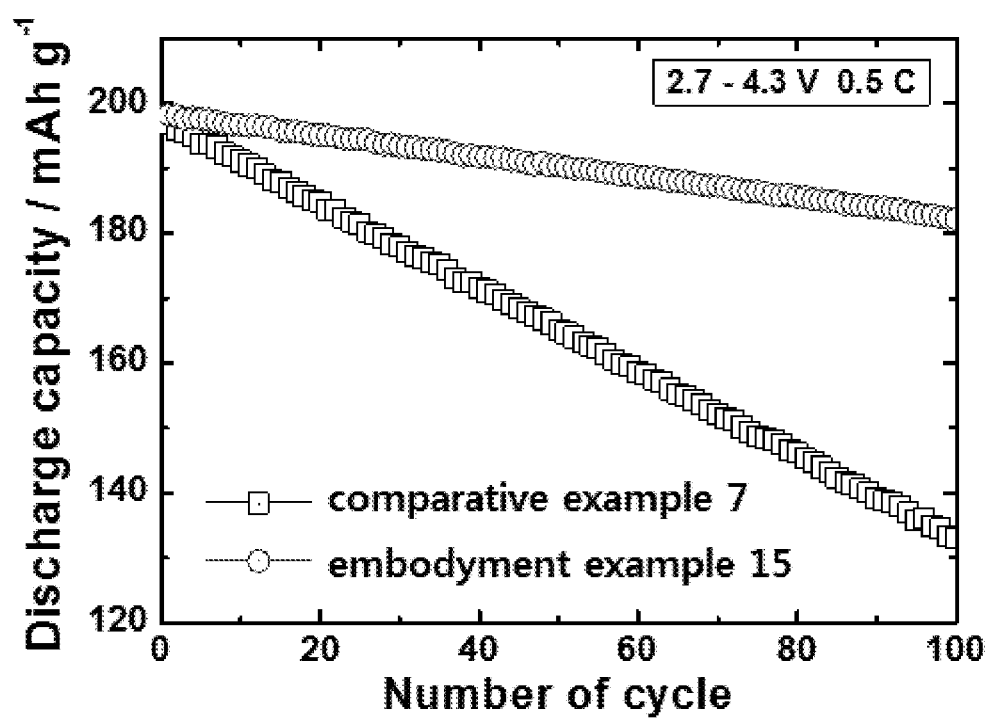

[FIG 17]
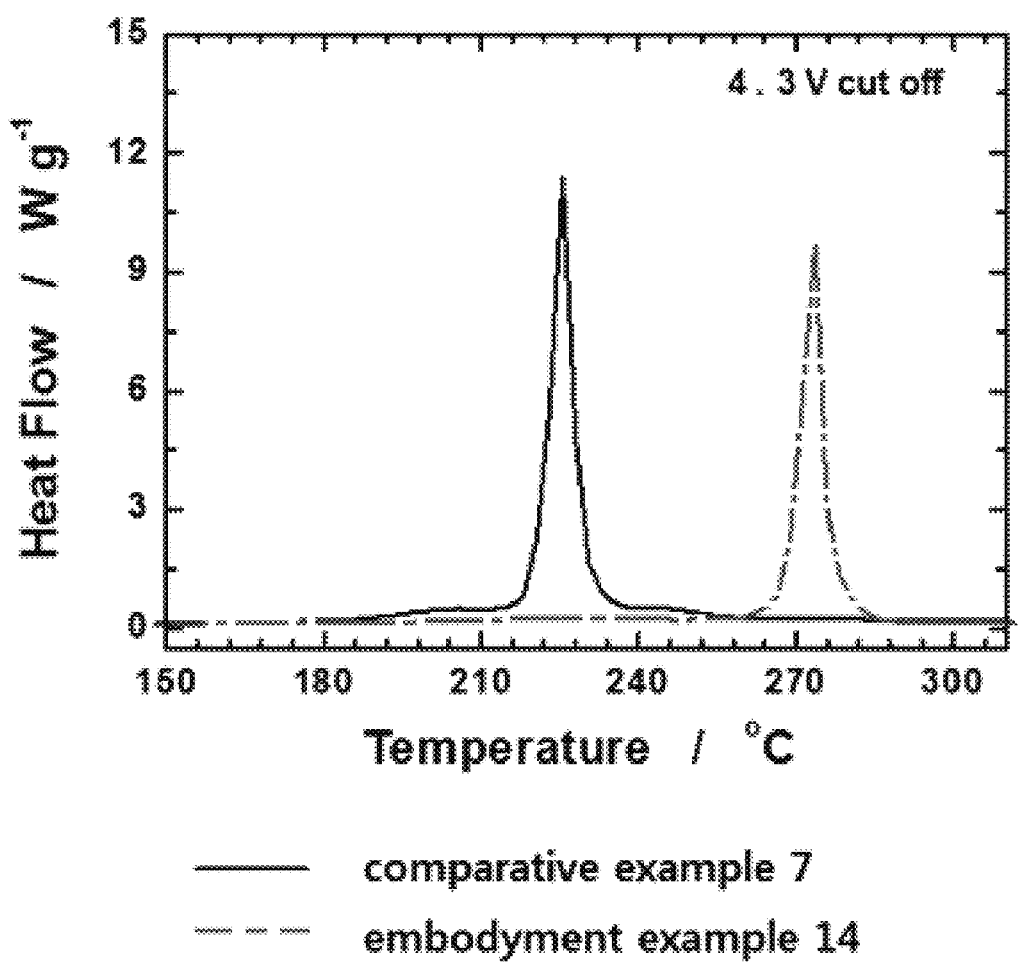

POSITIVE ACTIVE MATERIAL COMPOSITION FOR LITHIUM BATTERY, METHOD OF PREPARING THE SAME, AND LITHIUM BATTERY INCLUDING THE SAME

CROSS-REFERENCE TO RELATED APPLICATION

This application is a continuation-in-part of U.S. application Ser. No. 12/279,033, filed Aug. 11, 2008, which is 371 of PCT/KR06/05767, filed Dec. 27, 2006, which claims benefit of priority under 35 U.S.C § 119 from Korean Patent Application No. 10-2006-0028861, filed on Mar. 30, 2006, the contents of each of which are hereby incorporated by reference in its entirety.

BACKGROUND OF THE INVENTION (a) Field of the Invention

The present invention relates to a positive active material for a lithium battery, a method of preparing the same, and a rechargeable lithium battery including the same. More particularly, the present invention relates to a positive active material having excellent high-capacity and thermal stability, a method of preparing the same, and a rechargeable lithium battery including the same.

(b) Description of the Related Art

Lithium ion rechargeable batteries have been widely used as power sources for portable electronic devices since 1991. Recently, portable electronic devices (e.g., camcorders, cell phones, laptop computers, and so on) have been markedly developed with the rapid development of electronic, communication, and computer industries. Therefore, the lithium ion rechargeable batteries are required to supply the power for these portable electronic devices. In particular, a power source for a hybrid electric vehicle having both an internal combustion engine and a lithium rechargeable battery is being actively researched in the United States, Japan, Europe, and so on.

A high-capacity battery for an electric vehicle is the initial stage of development. Generally, nickel hydrogen batteries are used due to its safety, but the lithium ion batteries are advantageous in terms of energy density. However, the lithium ion batteries still have problems of both a high price and safety to be solved. Particularly, both $LiCoO_2$ and $LiNiO_2$ positive active materials that are commercially available have an unstable crystal structure due to delithiation upon charging the battery, so thermal characteristics of the $LiCoO_2$ and $LiNiO_2$ positive active materials are very deteriorated. That is, if the overcharged battery is heated at a temperature of 200° C. to 270° C., the structure of the battery is rapidly changed to cause an oxygen emitting reaction in lattices of the changed structure (J. R. Dahn et al., Solid State Ionics, 69, 265, 1994).

Concurrently, commercially available small lithium ion rechargeable batteries generally include $LiCoO_2$ used as a positive active material. $LiCoO_2$ is a material having stable charge and discharge characteristics, excellent electron conductivity, high stability, and a smooth discharge voltage characteristic. However, since cobalt (Co) is a rare material and has a high cost and toxicity to people, new positive electrode materials capable of replacing Co are required. Although $LiNiO_2$ having a layered structure similar to $LiCoO_2$ has a high discharge capacity, it has not commercially developed due to its unstable thermal and lifetime characteristics as well as its lack of safety at a high temperature. To solve these problems, it has been attempted to substitute a portion of nickel with transition metal elements so that the exothermic temperature is increased and to make a broad exothermal peak such that a rapid exothermal reaction is inhibited (T. Ohzuku et al., J. Electrochem. Soc., 142, 4033, 1995, No. 9-237631). However, the results have not yet been confirmed.

In addition, $LiNi_{1-x}Co_xO_2$ (x=0.1-0.3) materials in which a portion of nickel is substituted with thermally stable cobalt shows good charge-discharge and lifetime characteristics, but it cannot provide thermal stability. Moreover, there have been suggested a Li—Ni—Mn-based composite oxide in which a portion of Ni is substituted with thermally stable Mn and a Li—Ni—Mn—Co-based composite oxide in which a portion of Ni is substituted with Mn and Co and methods of preparing the same.

For example, Japanese Patent laid-open Publication Hei 08-171910 discloses a method of preparing a positive active material of $LiNi_xMn_{1-x}O_2$ (0.7≤x≤0.95) including: mixing an aqueous solution including Mn-containing salt and Ni-containing salt with an alkaline solution to co-precipitate Mn and Ni; mixing the co-precipitated compound with a lithium hydroxide; and firing the mixture of the co-precipitated compound and the lithium hydroxide.

Recently, Japanese Patent laid-open Publication No. 2000-227858 disclosed a positive active material in which Mn and Ni compounds were uniformly distributed at an atomic level to provide a solid solution instead of the concept that a transition metal element is partially substituted into $LiNiO_2$ or $LiMnO_2$.

According to European Patent No. 0918041 or U.S. Pat. No. 6,040,090, $LiNi_{1-x}Co_xMn_yO_2$ (0≤y≤0.3) has improved thermal stability compared to that of materials composed of only Ni and Co. However, $LiNi_{1-x}Co_xMn_yO_2$ (0≤y≤0.3) may not be commercially developed due to its reactivity with an electrolytic solution of $Ni^{4+}$. In addition, European Patent No. 0872450 A1 discloses $Li_aCo_bMn_cM_dNi_{1-(b+c+d)}O_2$ (M=B, Al, Si, Fe, Cr, Cu, Zn, W, Ti, or Ga) in which Ni was substituted with another metal as well as Co and Mn. However, since the active materials disclosed in these patents still include Ni, the thermal stability of the active materials is not fully improved.

The most spotlighted materials that have a layered crystal structure and is capable of replacing $LiCoO_2$ may include $Li[Ni_{1/2}Mn_{1/2}]O_2$ of which nickel and manganese are mixed at a ratio of 1:1 and $Li[Ni_{1/3}Co_{1/3}Mn_{1/3}]O_2$ of which nickel, cobalt, and manganese are mixed at a ratio of 1:1:1. These materials have advantages of lower cost, higher capacity, and superior thermal stability than $LiCoO_2$. However, the materials have lower electron conductivity than $LiCoO_2$, so high rate capacity and low temperature characteristics of the materials are deteriorated. In addition, even though the capacities of the materials are higher than that of $LiCoO_2$, the energy density of the battery including the same is not improved due to its low tap density. In particular, since these materials have low electronic conductivity (J. of Power Sources, 112, 2002, 41-48), their high power characteristics are inferior to that of $LiCoO_2$ or $LiMn_2O_4$ when used in a hybrid power source for electric vehicles.

$Li[Ni_{1/2}Mn_{1/2}]O_2$ and $Li[Ni_{1/3}Co_{1/3}Mn_{1/3}]O_2$ can be prepared by simultaneously precipitating two or three elements in an aqueous solution using a neutralization reaction to form a hydroxide or an oxide precursor, mixing the precursor with lithium hydroxide, and firing the same. Unlike the general co-precipitation reaction, a co-precipitated particle including manganese is shaped as an irregular plate and has a half tap density comparable to that of nickel or cobalt. For example, according to Japanese Patent laid-open Publication No. 2002-201028, a conventional reactor was used by the inert precipitation method, the generated precipitate particles were widely distributed, and shapes of primary particles were different from each other. In addition, Japanese Patent laid-open Publication Nos. 2003-238165, 2003-203633, 2003-242976, 2003-197256, 2003-86182, 2003-68299, and 2003-59490 and Korean Patent Nos. 0557240 and 0548988 disclose a method of preparing a high-capacity positive active material capable of improving charge and discharge reversibility and thermal stability by dissolving a nickel salt and a manganese salt, or a nickel salt, a manganese salt, and a cobalt salt in an aqueous solution, simultaneously introducing an alkali solution into a reactor while introducing a reductant or an inert gas to obtain a metal hydroxide or an oxide precursor, mixing the precursor with lithium hydroxide, and firing the same.

As described above, lithium transition metal-based oxides having a R m layered crystal structure includes $LiCoO_2$, $LiNiO_2$, $LiNi_{1-x}Co_xO_2$, $LiNi_{1-x-y}Co_xM_yO_2$ (M=Mn, Al, Mg, Ti, $Ti_{1/2}Mg_{1/2}$), $LiNi_{1/3}CO_{1/3}Mn_{1/3}O_2$, $LiNi_{1/2}Mn_{1/2}O_2$, $LiNi_xCO_{1-2x}Mn_xO_2$, and $Li_{1+z}[Ni_xCO_{1-2x}Mn_x]_{1-z}O_2$. Generally, these materials have a uniform metal composition on surfaces of particles and in their bulks.

To provide an excellent performance of the positive electrode, functions acting on the inside and the surface of a positive electrode power particle should be different from each other. In other words, the composition of the inside of the particles should have a lot of spaces which lithium ions are intercalated in or separated from and the particles should structurally stable. In addition, the reactivity of the surfaces of the particles with the electrolytic solution should be minimized.

A surface treatment method is used as a method of changing the surface composition of the positive active material. The surface treatment method includes coating a nanometer-thin coating layer on surfaces of the powder particles with a coating amount of 1 wt % to 2 wt % with respect to the total weight of the positive active material to inhibit the reactivity with the electrolytic solution; and heating the nanometer-thin coating layer to form a solid solution on the surfaces of the powder particles. Since the solid solution is formed on the surfaces of the powder particles, the metal composition of the surfaces of the powder particles is different that of the inside of the particles (J. Cho et al., J. Electrochem. Soc., 149, A127, 200; J. Dahn et al., Electrochem. and Solid State Lett., 6, A221 2003, U.S. Pat. Nos. 6,555,269, 6,274,273). In the event that the coating layer is formed on the surfaces of the powder particles by coating and heating, the surface layer combined with the coating material has a thickness of several tens or less nanometers and the composition ratio of the coating layer is different from that of the bulk of the particle. Thus, a coating efficiency may be reduced when the batteries are repeatedly used hundreds times. In addition, the coating layer is not uniformly distributed on the surfaces so that the coating efficiency is also reduced.

To overcome these problems, Korean Patent Laid-open Publication No. 2005-0083869 disclosed a lithium transition metal oxide having a concentration gradient of the metal composition. According to this method, after an inner material is synthesized, a material having another composition ratio is formed on the inner material to fabricate a double layer. The double layer is mixed with lithium salt and the mixture of the double layer and the lithium salt is heated. The inner material may be used as a commercially available lithium transition metal oxide.

According to this method, the metal compositions of the inner layer and the outer layer may be different from each other but the metal composition of the generated positive active material is not continuously and gradually varied. The metal composition of the positive active material may have a gradual gradient by a heat treatment process, but a concentration gradient difference of the positive active material hardly occurs by thermal diffusion of metal ions caused at a temperature of 850° C. or more. In addition, since the powder synthesized by the patent does not use ammonia corresponding to the chelating agent, a tap density of the powder is low to be unsuitable for a positive active material of a lithium rechargeable battery. Furthermore, according to the method, it is hard to control the lithium amount of the outer layer when the lithium transition metal oxide is used as the inner material, so the reproducibility is deteriorated.

Japanese Patent No. 2002-001724 discloses a composite positive active material formed by mixing a high-stable composite oxide $Li_{1.02}Ni_{0.65}Mn_{0.35}O_2$ with a high-conductivity composite oxide $Li_{1.02}Ni_{0.7}Co_{0.3}O_2$. The high-stable composite oxide $Li_{1.02}Ni_{0.65}Mn_{0.35}O_2$ has an excellent lifetime characteristic and excellent thermal stability but has deteriorated conductivity and deteriorated discharge capacity. The high-conductivity composite oxide $Li_{1.02}Ni_{0.7}Co_{0.3}O_2$ has excellent conductivity and excellent discharge capacity but has a deteriorated lifetime characteristic and deteriorated thermal stability. However, as a composition ratio of the high-stable composite oxide increases, the lifetime characteristic of the composite positive active material was excellent. As a composition ratio of the high-conductivity composite oxide increases, the high rate capacity of the composite positive active material was excellent. In other words, a positive active material with both high rate capacity and excellent lifetime characteristics has not been provided.

SUMMARY OF INVENTION

Some embodiments of the present invention provide a positive active material for a lithium battery in which a metal composition is distributed in a continuous concentration gradient.

Other embodiments of the present invention provide a method of preparing a positive active material for a lithium battery in which a metal composition is distributed in a continuous concentration gradient.

Still other embodiments of the present invention provide a lithium battery comprising a positive active material in which a metal composition is distributed in a continuous concentration gradient.

According to some embodiments of the present invention, a positive active material for a lithium battery may include: an internal bulk part including at least two of nickel, manganese, and cobalt; and an external bulk part surrounding the internal bulk part. At least one metal element is distributed in a continuous concentration gradient from an interface between the internal bulk part and the external bulk part to a surface of the positive active material. A concentration change rate of the at least one metal element from the interface to the surface of the positive active material is in a range of 0.1 mol %/0.1 μm to 50 mol %/0.1 μm.

If a concentration change rate per 0.1 μm is higher than 50 mol %, the thermal stability becomes worse, and if a concentration change rate per 0.1 μm is lower than 0.10 mol %, there is no particular effect of a concentration change.

In some embodiments, the concentration change rate of the at least one metal element from the interface to the surface of the positive active material may be in a range of 0.1 mol %/0.1 μm to 20 mol %/0.1 μm.

In some embodiments, a concentration change rate of nickel in the external bulk part may be in a range of 2 mol %/0.1 μm to 20 mol %/0.1 μm, and a concentration change rate of cobalt in the external bulk part may be in a range of 0.1 mol %/0.1 μm to 10 mol %/0.1 μm.

In some embodiments, the concentration change rate of nickel, the concentration change rate of cobalt, and a concentration change rate of manganese in the external bulk part may satisfy the following relation formulas 1 and 2, $$M_{Ni} \geq M_{Co}$$ [Relation formula 1]

$$M_{Ni} \geq M_{Mn}$$ [Relation formula 2]

wherein "$M_{Ni}$" is the concentration change rate of nickel, "$M_{Co}$" is the concentration change rate of cobalt, and "$M_{Mn}$" is the concentration change rate of manganese.

In some embodiments, a concentration of a metal in a surface portion of the external bulk part may be at least 5% more than that of the metal in the internal bulk part.

In some embodiments, the internal bulk part may include a high-capacity compound including nickel, cobalt, and manganese, and the external bulk part may include a compound including nickel and manganese and having excellent thermal stability.

In some embodiments, the internal bulk part may include a lithium-containing compound expressed by the following chemical formula 1, and the external bulk part may include one selected from a group consisting of a material expressed by the following chemical formula 2, a material expressed by the following chemical formula 3, and a mixture thereof, $$Li_aNi_{1-x-y-z}Co_xMn_yM_zO_{2-\delta}X_\delta$$ [Chemical formula 1]

wherein, in the chemical formula 1, 0.95≤a≤1.2, 0.01≤x≤0.5, 0.01≤y≤0.5, 0.005≤z≤0.3, 0.05≤x+y+z≤0.4, "M" is at least one element selected from a group consisting of Mg, Al, Cr, V, Ti, Cr, Fe, Zr, Zn, Si, Y, Nb, Ga, Sn, Mo, W, and combinations thereof, "X" is a halogen of F, Cl, Br, or I, and 0≤δ≤0.1, $$Li_aNi_{1-x-y-z}Co_xMn_yM_zO_{2-\delta}X_\delta$$ [Chemical formula 2]

wherein, in the chemical formula 2, 0.95≤a≤1.2, 0.01≤x≤0.4, 0.01≤y≤0.5, 0.002≤z≤0.2, 0.4<x+y+z≤0.95, "M" is at least one element selected from a group consisting of Mg, Al, Cr, V, Ti, Cr, Fe, Zr, Zn, Si, Y, Nb, Ga, Sn, Mo, W, and combinations thereof, "X" is a halogen of F, Cl, Br, or I, and 0≤δ≤0.1, and $$Li_aNi_xCo_{1-2x}Mn_{x-y}M_yO_{2-\delta}X_\delta$$ [Chemical formula 3]

wherein, in the chemical formula 3, 0.95≤a≤1.2, 0.01≤x≤0.5, 0≤y≤0.1, "M" is at least one element selected from the group consisting of Mg, Al, Cr, V, Ti, Cr, Fe, Zr, Zn, Si, Y, Nb, Ga, Sn, Mo, W, and combinations thereof, "X" is a halogen of F, Cl, Br, or I, and 0≤δ≤0.1.

In some embodiments, an average particle diameter of the internal bulk part may be in a range of 4 μm to 15 μm, and an average particle diameter of particles of the positive active material may be in a range of 9 μm to 30 μm.

BRIEF DESCRIPTION OF THE DRAWINGS

The present invention will become more apparent in view of the attached drawings and accompanying detailed description.

FIG. 1 is a 500-times magnified FE-SEM photograph showing a ([Ni$_{0.80}$ Co$_{0.13}$Mn$_{0.07}$]$_{0.6}$[Ni$_{0.4}$Co$_{0.4}$Mn$_{0.2}$]$_{0.4}$)(OH)$_2$ powder of the positive active material precursor fabricated from Example 1, which has a concentration gradient.

FIG. 2 is a 4000-times FE-SEM magnified photograph showing a ([Ni$_{0.80}$Co$_{0.13}$Mn$_{0.07}$]$_{0.6}$[Ni$_{0.4}$Co$_{0.4}$Mn$_{0.2}$]$_{0.4}$)(OH)$_2$ powder of the positive active material precursor fabricated from Example 1, which has a concentration gradient.

FIG. 3 is a FE-SEM photograph showing a cross-sectional view of the positive active material precursor of a ([Ni$_{0.80}$Co$_{0.13}$Mn$_{0.07}$]$_{0.6}$[Ni$_{0.4}$Co$_{0.4}$Mn$_{0.2}$]$_{0.4}$)(OH)$_2$ powder having a concentration gradient fabricated from Example 1.

FIG. 4 is a FE-SEM photograph showing a cross-sectional view of the positive active material precursor of a Li ([Ni$_{0.80}$Co$_{0.13}$Mn$_{0.07}$]$_{0.6}$[Ni$_{0.4}$Co$_{0.4}$Mn$_{0.2}$]$_{0.4}$)O$_2$ powder having a concentration gradient fabricated from Example 1.

FIG. 5 is a X-ray diffraction pattern (XRD) of (a) a positive active material powder (Li[Ni$_{0.80}$ Co0.1Mn0.1]O2) according to Comparative Example 1 and (b) a positive active material powder a Li([Ni$_{0.80}$ Co$_{0.13}$Mn$_{0.07}$]$_{0.6}$[Ni$_{0.4}$Co$_{0.4}$Mn$_{0.2}$]$_{0.4}$)O$_2$ having a concentration gradient according to Example 1.

FIG. 6 is a graph showing a charge capacity depending upon cycle repetitions after charging and discharging (a) a cell including a positive active material powder (Li[Ni$_{0.80}$ Co$_{0.1}$Mn$_{0.1}$]O$_2$) according to Comparative Example 1 and (b) a cell including a positive active material powder Li([Ni$_{0.80}$ Co$_{0.13}$Mn$_{0.07}$]$_{0.6}$[Ni$_{0.4}$Co$_{0.4}$Mn$_{0.2}$]$_{0.4}$)O$_2$ having a concentration gradient according to Example 1 at 3.0 to 4.3V and 0.2 C.

FIG. 7 is a data graph of differential thermogravimetric analysis for the positive active material of which (a) the cell including a positive active material powder (Li[Ni$_{0.80}$ Co$_{0.1}$Mn$_{0.1}$]O$_2$) according to Comparative Example 1 and (b) the cell including a positive active material a Li ([Ni$_{0.80}$ Co$_{0.13}$Mn$_{0.07}$]$_{0.6}$[Ni$_{0.4}$Co$_{0.4}$Mn$_{0.2}$]$_{0.4}$)O$_2$ according to Example 1 having a concentration gradient are fully charged at 4.3V.

FIG. 8 is a discharge capacity graph depending upon cycle repetitions in which (a) the cell including a positive active material powder (Li[Ni$_{0.80}$ Co$_{0.1}$Mn$_{0.1}$]O$_2$) according to Comparative Example 1 and (b) the cell including a positive active material Li ([Ni$_{0.80}$ Co$_{0.13}$Mn$_{0.07}$]$_{0.6}$[Ni$_{0.4}$Co$_{0.4}$Mn$_{0.2}$]$_{0.4}$)O$_2$ according to Example 2 are charged and discharged at 3.0 to 4.3V and at 0.2 C.

FIG. 9 is a data graph of differential thermogravimetric analysis for the positive active material of which (a) the cell including the positive active material powder (Li [Ni$_{0.80}$Co$_{0.1}$Mn$_{0.1}$]O$_2$) according to Comparative Example 1 and (b) the cell including the positive active material Li([Ni$_{0.80}$ Co$_{0.1}$Mn$_{0.1}$]$_{0.7}$ [Ni$_{0.5}$Co$_{0.2}$Mn$_{0.3}$]$_{0.3}$)O$_2$ having a concentration gradient according to Example 2 are fully charged at 4.3V.

FIG. 10 is a data graph of differential thermogravimetric analysis for the positive active material of which (a) the cell including the positive active material powder (Li [Ni$_{0.80}$Co$_{0.1}$Mn$_{0.1}$]O$_2$) according to Comparative Example 1 and (b) the positive active material Li([Ni$_{0.80}$Co$_{0.1}$Mn$_{0.1}$]$_{0.7}$ [Ni$_{0.475}$ Co$_{0.05}$Mn$_{0.475}$]$_{0.3}$)O$_2$ having a concentration gradient according to Example 3 are fully charged at 4.3V.

FIGS. 11 to 13 are graphs showing results obtained by measuring charge and discharge, lifetime, and differential scanning calorimetry (DSC) characteristics of coin-type cells including positive active materials according to some embodiments of the present invention and Comparative examples; and FIGS. 14 to 17 are graphs showing results obtained by measuring charge and discharge, lifetime, and DSC characteristics of coin-type cells including positive active materials according to other embodiments of the present invention and Comparative examples.

DETAILED DESCRIPTION OF THE EMBODIMENTS

The present invention will now be described more fully hereinafter with reference to the accompanying drawings, in which exemplary embodiments of the present invention are shown. The advantages and features of the present invention and methods of achieving them will be apparent from the following exemplary embodiments that will be described in more detail with reference to the accompanying drawings. It should be noted, however, that the present invention is not limited to the following exemplary embodiments, and may be implemented in various forms. Accordingly, the exemplary embodiments are provided only to disclose the present invention and let those skilled in the art know the category of the present invention. In the drawings, embodiments of the present invention are not limited to the specific examples provided herein and are exaggerated for clarity.

The positive active material of one embodiment of the present invention includes an internal bulk part and an external bulk part surrounding the internal bulk part, wherein the metal composition is present in a continuous concentration gradient from the interface between the internal bulk part and the external bulk part to the surface of the active material.

The phrase "the metal composition is present in a continuous concentration gradient" denotes that the metal concentrations other than lithium are gradually increasing or decreasing in the concentration distribution. The concentration distribution means that the metal concentration is varied from 0.1 to 30 mole % per 0.1 μm distance from the outer surface of the internal bulk part to the outer surface of the external bulk part. According to another embodiment, the metal concentration is varied from 0.1 to 20 mole %. According to another embodiment, it ranges from 1 to 10 mole %.

The internal bulk part includes a center part of the active material particle and the surrounding part thereof. The external bulk part includes from the outer surface of the internal bulk part to the surface area of the external bulk part.

The volume of the internal bulk part ranges from 35 and 95 volume % based on the total volume of the positive active material. According to another embodiment, it ranges from 40 and 90 volume %. According to yet another embodiment, it ranges from 50 and 90 volume %. When the internal bulk part is less than 35 volume %, the discharge capacity is decreased. When it is more than 95 volume %, the thermal safety is deteriorated.

The average particle diameter of the internal bulk part ranges from 5 to 15 μM. According to another embodiment, it ranges from 5 and 13 μm. The average particle diameter of all particles of the positive active material ranges from 10 and 30 μm. According to another embodiment, it ranges from 13 to 25 μm. If the average particle diameter of the internal bulk part is less than 5 μm, the discharge capacity is decreased. When it is more than 15 μm, the thermal stability is deteriorated. Further, if the particle diameter is less than 10 μm, it is hard to synthesize a material having a required concentration distribution. When it is more than 30 μm, the distance of transferring the lithium ions is too great, so the rate capability is deteriorated.

On the surface of the external bulk part, the metal concentration is increased at least 10 mole % based on that of the internal bulk part. According to another embodiment, it is increased from 10 mole % to 70 mole % more than that of the internal bulk part. According to yet another embodiment, the increase ranges from 15 mole % to 60 mole %. When the differentiation of the metal concentration is less than 10 mole %, it is hard to find the concentration distribution in the particle.

The internal bulk part includes a high-capacity compound including Ni, Co, and Mn, and the external bulk part includes a thermally stable compound including Ni and Mn.

The metal composition at the interface between the external bulk part and the internal bulk part is the same as in the internal bulk part, but the metal composition other than lithium in the external bulk part is distributed in a continuous gradient. In other words, the internal bulk part includes a lithium-included compound represented by the following Chemical formula 1 (Ni composition in Formula 1 ranges from 60 mole % and 95 mole %) in which the Ni component is large and that has good safety and cycle-life characteristics, while the surface of the external bulk part that contacts the electrolyte includes: a lithium-included compound represented by the following Chemical formula 2 (Ni composition in Chemical formula 2 ranges from 5 mole % and 60 mole %) in which the Ni component is less and that has lesser safety and cycle-life characteristics, a lithium-included compound represented by Formula 3 in which the oxidation numbers of the transition elements are $Ni^{2+}$, $Co^{3+}$, or $Mn^{4+}$, or a mixture thereof. The lithium-included compound represented by Chemical Formula 2 or Chemical Formula 3 may be present in a mixed form in the external bulk part. Alternatively, the compound represented by Chemical Formula 2 and the compound represented by Chemical Formula 3 may be present in a bilayer form in the external bulk part.

[Chemical formula 1]

$Li_aNi_{1-x-y-z}Co_xMn_yM_zO_{2-\delta}X_\delta$ wherein, in the above Chemical formula 1, $0.95 \leq a \leq 1.2$, $0.01 \leq x \leq 0.5$, $0.01 \leq y \leq 0.5$, $0.005 \leq z \leq 0.3$, $0.05 \leq x+y+z \leq 0.4$, M is at least one element selected from the group consisting of Mg, Al, Cr, V, Ti, Cr, Fe, Zr, Zn, Si, Y, Nb, Ga, Sn, Mo, W, and combinations thereof, X is a halogen of F, Cl, Br, or I, and $0 \leq \delta \leq 0.1$.

[Chemical formula 2]

$Li_aNi_{1-x-y-z}Co_xMn_yM_zO_{2-\delta}X_\delta$ wherein, in the above formula, $0.95 \leq a \leq 1.2$, $0.01 \leq x \leq 0.4$, $0.01 \leq y \leq 0.5$, $0.002 \leq z \leq 0.2$, $0.4 < x+y+z \leq 0.95$, M is at least one element selected from the group consisting of Mg, Al, Cr, V, Ti, Cr, Fe, Zr, Zn, Si, Y, Nb, Ga, Sn, Mo, W, and combinations thereof, X is a halogen of F, Cl, Br, or I, and $0 \leq \delta \leq 0.1$.

[Chemical formula 3]

$Li_aNi_xCo_{1-2x}Mn_{x-y}M_yO_{2-\delta}X_\delta$ wherein, in the above formula, $0.95 \leq a \leq 1.2$, $0.01 \leq x \leq 0.5$, $0 \leq y \leq 0.1$, M is at least one element selected from the group consisting of Mg, Al, Cr, V, Ti, Cr, Fe, Zr, Zn, Si, Y, Nb, Ga, Sn, Mo, W, and combinations thereof, X is a halogen of F, Cl, Br, or I, and $0 \leq \delta \leq 0.1$.

When the external bulk part includes the lithium-included compound and the amount of Ni is less than 60 mole %, the Ni4+ amount in the transition elements when the battery is fully charged is decreased and the thermal stability is improved. When it includes the lithium-included compound represented by Chemical Formula 3, the thermal stability is superior to that of $LiCoO_2$.

The internal bulk part of the active material that does not contact the electrolyte is designed to include a high capacity lithium-included compound having a high Ni amount. The surface of the active material (outer surface of external bulk part) that contacts the electrolyte is designed to include a lithium-included compound having a low Ni amount so that the stability is improved. Herein, the metal composition other than lithium in the external bulk part is distributed in a continuous concentration.

As the concentration of the metal composition is continuously distributed in the positive active material according to one embodiment of the present invention, a sharp boundary area is not formed on the interface between internal bulk part and the external bulk part and the crystal structure thereof is stable. In addition, since the external bulk part includes the lithium-included compound having thermally stable metal compositions that increase from the interface between the internal bulk part and the external bulk part to the surface of the active material, the thermal safety is improved.

Since $LiNiO_2$ for the positive active material has inferior thermal stability to that of $LiCoO_2$, and the swelling phenomenon is terrible at a high temperature, it is hard to commercialize. Such thermal instability is caused by the strong catalyst reaction of $Ni^{4+}$ in which the swelling phenomenon rapidly occurs upon contact with the electrolyte solution. Accordingly, as the external bulk part according to the present invention has a high density and few pores, it can prevent contact with $Ni^{4+}$ having high catalyst activity with the electrolyte solution and the swelling is remarkably improved.

Further, since the metal ion concentration is continuously varied from the inside of the positive active particle, the internal bulk part can have the high capacity characteristic. Further, as the reactivity of the particle surface with the electrolyte solution is minimized, the cycle-life characteristic is improved. In addition, as the metal ions are disposed on the surface of the particle by design, the battery safety at a high temperature is improved.

Hereinafter, a positive active material including the external bulk part in which the metal composition is distributed in a continuous concentration gradient is described as follows.

At the first step, a metal salt aqueous solution including nickel, cobalt, manganese, and an optional metal (M) (herein, M is same as M in the above Formula 1), a chelating agent, and a basic aqueous solution are mixed in a reactor to provide a spherical shaped first metal hydroxide precipitate. Such first metal hydroxide precipitate is present in the internal bulk part.

The metal salt aqueous solution is prepared by adding salts including nickel salt, cobalt salt, manganese salt, and M to a solvent, or by preparing aqueous solutions including each of the nickel salt, cobalt salt, manganese salt, and M salt and mixing these solutions. The metal salt may include sulfate, nitrate, acetate, halide, hydroxide, and so on, but it is not limited thereto as long as it can be dissolved in water. The metal salt aqueous solution is prepared by mixing nickel, cobalt, manganese, and metal (M) while controlling the mole ratio. The mole ratio can be easily calculated from Formula 1. The metal salt aqueous solution may have a concentration of 1M to 3M.

The chelating agent may include an ammonia aqueous solution, an ammonium sulfate aqueous solution, and the mixture thereof. The mole ratio of the chelating agent and metal salt aqueous solution may be 0.2 to 0.5:1, 0.2 to 0.4:1. The reason for setting the mole ratio of the chelating agent to 1 mole of the metal aqueous solution as 0.2 to 0.5 is to recover the chelating agent which remains as an intermediate product. The chelating agent may be reacted with the metal at more than 1:1 to provide a composite that is reacted with caustic soda, and some chelating agents remain, then the remained chelating agents are recovered. In addition, it increases the crystallinity and stability of the positive active material.

The basic aqueous solution has a concentration of between 4M and 5M.

In more detail, a nickel salt, a manganese salt, a cobalt salt, and an optional metal (M) salt are dissolved in distilled water and introduced into a reactor simultaneously with a chelating agent and a basic aqueous solution to provide a precipitate. The co-precipitating process is one in which two or more elements are simultaneously precipitated in an aqueous solution according to the neutralization reaction to provide a composite hydroxide.

Herein, the average retaining time of the mixed solution in the reactor is controlled to within 4 to 12 hours, pH is controlled to within 10 to 12.5, and the temperature of the reactor is maintained within 50° C. to 80° C. According to another embodiment, pH is set as 10.5 and 11.5. The reason for increasing the temperature at the limitation is that it is hard to provide the high density composite hydroxide since the generated cobalt hydroxide is precipitated as a complex salt at a low temperature. The reacting duration in the reactor ranges from 8 to 30 hours. According to another embodiment, it ranges from 10 to 30 hours.

In the second step, the transition element mixed aqueous solution having a constant concentration distribution is introduced into a reactor, and simultaneously an ammonia aqueous solution and a basic aqueous solution are supplied thereto. Herein, in order to provide the external bulk part surrounding the first metal hydroxide precipitate in which the metal composition is continuously distributed in a concentration gradient, another mixed metal aqueous solution having a different composition is continuously added into the mixed metal aqueous solution having a constant metal composition. The metal composition and the gradient of the external bulk part are controlled by the composition and the supplying rate of the mixed metal aqueous solution supplied into the raw material tank. The thickness of the external bulk part in which the metal composition is continuously distributed in a concentration gradient is determined by controlling the duration for synthesizing the external bulk part precursor in the reactor. Thereby, the precipitate of the second metal hydroxide is surrounded with the surface of the first metal hydroxide precipitate. The reaction duration is controlled within 1 to 10 hours to determine the thickness of the external bulk part layer.

In the first step and the second step, the reaction may be carried out under an atmosphere of nitrogen, pH 10 to 12.5, a temperature of 30 to 80° C., and a reaction agitation speed of 500 to 2000 rpm.

In the third step, the precipitate is dried to provide an internal bulk part and an external bulk part including the metal oxide in which the metal is continuous contributed in a concentration gradient. The drying process is performed at a temperature of between 110° C. and 200° C. for 15 to 30 hours. Further, the metal oxide in which the metal is continuously distributed may be provided by heating the precipitate. The heat treatment is preformed at a temperature of between 400 and 550° C. for 4 to 10 hours.

In the fourth step, a lithium salt is added to the active material precursor including the internal bulk part and the external bulk part including the metal hydroxide or the metal oxide such that the metal is continuously distributed to provide an active material. Herein, the final active material includes the internal bulk part and the external bulk part including a lithium composite metal oxide in which the metal composition is distributed in a continuous concentration gradient. The heating process is performed at a temperature of between 700° C. and 1100° C. after mixing the active material precursor and the lithium salt. The heating process may be performed under an oxidation atmosphere of air or oxygen for 10 to 30 hours. Before the heating process, it is maintained at a temperature between 250 to 650° C. for 5 to 20 hours as a pre-firing process. In addition, an annealing process is further included at a temperature from 600 to 750° C. for 10 to 20 hours after the heating process.

The reactor is mounted with reverse rotating blades, 1 to 4 baffle(s) leaving a space to the inner wall of 2 to 3 cm, and a cylinder disposed between the baffle and the rotating blades in order to provide a uniform mixture between the upper and lower parts inside the reactor. As does the reverse blades, the space between the baffle and the inner wall of the reactor helps to solve local non-uniformity by changing the stream strength and direction and enlarging the turbulence effect. Accordingly, because the present invention uses the reactor, the tap density of the composite hydroxide is improved by 10% over than that of the conventional reactor. The tap density of the composite hydroxide is 1.75 g/cm$^3$ or more. According to another embodiment, it is 2.0 g/cm$^3$ or more. According to yet another embodiment, it is 2.2 g/cm$^3$.

The provided positive active material includes the internal bulk part and the external bulk part in which the metal composition is distributed in a continuous concentration gradient and has a specific surface area of 0.1 m$^2$/g or more. According to another embodiment, it ranges from 0.1 to 3 m$^2$/g. When the specific surface area is less than 0.1 m$^2$/g, the reactivity inside the battery is decreased and the battery characteristics are remarkably deteriorated.

The present invention provides a lithium battery including the positive active material having a structure in which the metal composition is distributed in a continuous concentration gradient between the internal bulk part and the external bulk part. The lithium battery includes a positive electrode including the aforementioned positive active material, a negative electrode including a negative active material, and a separator interposed between them. Further, it includes an electrolyte immersing the positive electrode, the negative electrode, and the separator.

The negative active material includes a material capable of reversibly intercalating/deintercalating lithium ions, and examples thereof include artificial graphite, natural graphite, graphite carbon fiber, and so on. The metal lithium may be used for a negative active material. The electrolyte may include a liquid electrolyte solution including a lithium salt and a non-aqueous organic solvent, or a polymer gel electrolyte.

EXAMPLES

The present invention is further explained in more detail with reference to the following examples. These examples, however, should not in any sense be interpreted as limiting the scope of the present invention.

Example 1

Preparation of Positive Active Material 4 liters of distilled water were introduced into a co-precipitation reactor (4 L, rotating motor output 80 W or more), supplied with nitrogen gas at a rate of 0.5 liter/min, and agitated at 1000 rpm while maintaining a reactor temperature of 50° C. while dissolved oxygen was removed.

A 2.4 M metal aqueous solution in which nickel sulfate, cobalt sulfate, and manganese sulfate were mixed at a mole ratio of 80:13:7 was continuously added into a reactor at 0.3 liter/hour, and a 4.8 mole ammonia solution was also continuously added into the reactor at 0.03 liter/hour. In addition, a 4.8 mole hydroxide sodium solution was added thereto in order to maintain pH 11.

The speed of an impeller was controlled to 1000 rpm. The average time of retaining the solution in the reactor was maintained at 6 hours by controlling the flowing amount. After the reaction is reached at the stationary state, the reactant is continued for the retaining time on the stationary state to obtain the denser composite metal hydroxide.

When the particle size of the composite metal hydroxide that is reached under the normal condition ranges from 8 and 13 µm the capacity of the metal aqueous solution of nickel sulfate, cobalt sulfate, and manganese sulfate was kept at 4 L. Then, the reaction was continued using a metal aqueous solution of which the molar ratio of nickel sulfate, cobalt sulfate, and manganese sulfate was continuously changed from 80:13:7 to 40:40:20 in order to provide an external bulk part having a concentration distribution thereof.

When the molar ratio of the metal aqueous solution reached 40:40:20, the reaction was continued at this molar ratio until reaching the normal condition to obtain a spherical nickel-manganese-cobalt composite hydroxide having a concentration gradient. The metal composite hydroxide was filtered, washed with water, and dried with an air dryer at 110° C. for 15 hours.

The metal composite hydroxide and lithium hydroxide (LiOH) were mixed at a molar ratio of 1:1.07 m and heated at a ratio of 2° C./min. Then, it was kept at 500° C. for 10 hours to perform the pre-firing and fired at 780° C. for 20 hours to provide a positive active material powder of which the internal bulk part was composed of Li[Ni$_{0.8}$Co$_{0.13}$Mn$_{0.07}$]O$_2$ and the external bulk part was composed of from Li[Ni$_{0.8}$Co$_{0.13}$Mn$_{0.07}$]O$_2$ to Li[Ni$_{0.4}$Co$_{0.4}$Mn$_{0.2}$]O$_2$ while continuously changing the concentration with a gradient.

Example 2

Preparation of Positive Active Material

A positive active material powder was prepared in accordance with the same procedure as in Example 1, except that the composition of the internal bulk part was Li[Ni$_{0.80}$Co$_{0.1}$Mn$_{0.1}$]O$_2$ and that of the external bulk part was composed of Li[Ni$_{0.80}$Co$_{0.1}$Mn$_{0.1}$]O$_2$ to Li[Ni$_{0.5}$Co$_{0.2}$Mn$_{0.3}$]O$_2$ in a continuous concentration gradient between the two components.

Example 3

Preparation of Positive Active Material

A positive active material powder was prepared in accordance with the same procedure as in Example 1, except that the composition of the internal bulk part was Li[Ni$_{0.80}$Co$_{0.1}$Mn$_{0.1}$]O$_2$ and that of the external bulk part was composed of from Li[Ni$_{0.80}$Co$_{0.1}$Mn$_{0.1}$]O$_2$ to Li[Ni$_{0.475}$Co$_{0.05}$Mn$_{0.475}$]O$_2$ in a continuous concentration gradient between the two components. Herein, the external part bulk composition of Li[Ni$_{0.475}$Co$_{0.05}$Mn$_{0.475}$]O$_2$ had a thermal stability that was better than those of Examples 1 and 2 because oxidation state of Ni was +2, Co was +3, and Mn was +4 in this composition, and those of Example 1 and Example 2 were Ni-based compositions.

Example 4

Preparation of Positive Active Material

A positive active material was prepared in accordance with the same procedure as in Example 1, except that the external bulk part was prepared by reacting the metal aqueous solution in which the molar ratio of nickel sulfate, cobalt sulfate, manganese sulfate, and aluminum metal was changed from 80:10:5:5 to 40:30:15:15. The internal bulk part was $Li[Ni_{0.80}Co_{0.1}Mn_{0.05}Al_{0.05}]O_2$ and the external bulk part had a continuous gradient of the concentration of from $Li[Ni_{0.80}Co_{0.1}Mn_{0.05}Al_{0.05}]O_2$ to $Li[Ni_{0.4}Co_{0.3}Mn_{0.15}Al_{0.15}]O_2$.

Comparative Example 1

Preparation of Positive Active Material

A positive active material of $Li[Ni_{0.80}Co_{0.1}Mn_{0.1}]O_2$ was prepared.

Comparative Example 2

Preparation of Positive Active Material

A positive active material powder was prepared by the same procedure as in Example 1, except that the molar ratio of the metal aqueous solution of nickel sulfate, cobalt sulfate, and manganese sulfate was fixed at 80:10:10. Thus, the internal bulk part was composed of $Li[Ni_{0.80}Co_{0.13}Mn_{0.07}]O_2$, and the external bulk part was composed of $Li[Ni_{0.80}Co_{0.1}Mn_{0.1}]O_2$ but the concentration was not changed.

Fabrication of Rechargeable Lithium Battery

Each positive active material prepared in accordance with procedures of Examples 1 to 4 and Comparative Example 1 was mixed with a conductive material of acetylene black and a binder of polyvinylidene fluoride (PVdF) at a weight ratio of 80:10:10 to provide slurry. The slurry was uniformly coated on a 20 μm thick aluminum foil and dried at 120° C. under vacuum to provide a positive electrode for a rechargeable lithium cell.

With the aforementioned positive electrode, the counter electrode of a lithium foil, a separator of a porous polyethylene membrane (manufactured by Celgard LLC, Celgard 2300, thickness: 25 μm), and a liquid electrolyte solution in which LiPF6 was dissolved in a mixed solvent (ethylene carbonate and diethyl carbonate at a volume ratio of 1:1) at a 1 M concentration, a coin cell was fabricated in a commonly known process.

FIG. 1 is a 500-times magnified FE-SEM photograph of the obtained metal hydride powder that the active material precursor $([Ni_{0.80}Co_{0.13}Mn_{0.07}]_{0.6}[Ni_{0.4}Co_{0.4}Mn_{0.2}]_{0.4})(OH)_2$ according to Example 1 was dried at 110° C. for 15 hours in an air dryer. FIG. 2 is a 400-times magnified FE-SEM photograph thereof. The precursor composed of the internal bulk part and the external bulk part was confirmed to have the nickel-manganese-cobalt composite hydroxide in a spherical shape.

FIG. 3 is an FE-SEM photograph showing a cross-sectional view of a positive active material precursor powder $([Ni_{0.80}Co_{0.13}Mn_{0.07}]_{0.6}[Ni_{0.4}Co_{0.4}Mn_{0.2}]_{0.4})(OH)_2$ having a concentration gradient fabricated from Example 1, which has a concentration gradient. In addition, FIG. 4 is an FE-SEM photograph showing a cross-sectional view of a positive active material precursor powder $Li([Ni_{0.80}Co_{0.13}Mn_{0.07}]_{0.6}[Ni_{0.4}Co_{0.4}Mn_{0.2}]_{0.4})O_2$ having a concentration gradient fabricated from Example 1. In order to confirm the concentration distribution of the internal powder, EDX composition analysis was performed at A and B markers in FIGS. 3 and A, B, and C markers in FIG. 4. The EDX analysis (the metal ions showed the average composition because the X-ray was passed from the surface to the powder surface) showed that the precursor powder was well synthesized along to the designed composition. In the case of the firing powder, the concentration distribution difference was slightly decreased due to the metal ions that were diffused during the high temperature firing step. However, it was confirmed that the concentrations of Ni, Co, and Mn metal elements were continuously distributed.

TABLE 1

Internal Composition Analysis for
Powder $([Ni_{0.8}Co_{0.13}Mn_{0.07}]_{0.6}[Ni_{0.4}Co_{0.4}Mn_{0.2}]_{0.4})(OH)_2$ and
Powder $Li([Ni_{0.8}Co_{0.13}Mn_{0.07}]_{0.6}[Ni_{0.4}Co_{0.4}Mn_{0.2}]_{0.4})O_2$

| | Analysis Position | Ni (mole %) | Co (mole %) | Mn (mole %) |
|---|---|---|---|---|
| $([Ni_{0.8}Co_{0.13}Mn_{0.07}]_{0.6}[Ni_{0.4}Co_{0.4}Mn_{0.2}]_{0.4})(OH)_2$ | A (Inside) | 77 | 13 | 10 |
| | B (out side) | 51 | 33 | 16 |
| $Li([Ni_{0.8}Co_{0.13}Mn_{0.07}]_{0.6}[Ni_{0.4}Co_{0.4}Mn_{0.2}]_{0.4})O_2$ | A (Inside) | 71 | 21 | 9 |
| | C (starting position of external bulk part) | 64 | 24 | 12 |
| | B (out side) | 60 | 27 | 13 |

FIG. 5 is an X-ray diffraction pattern (XRD) of (a) a firing powder ($Li[Ni_{0.80}Co_{0.1}Mn_{0.1}]O_2$) according to Comparative Example 1 and (b) a firing powder ($Li([Ni_{0.80}Co_{0.13}Mn_{0.07}]_{0.6}[Ni_{0.4}Co_{0.4}Mn_{0.2}]_{0.4})O_2$) according to Example 1. From the fact that the (006) and (102) peak isolation and (018) and (110) peak isolation were well identified at the diffraction peaks of all powders and the (003) and (104) peak ratios were 1 or more, the lithium composite oxide had a hexagonal NaFeO2 structure having a space group of R 3 m. Particularly, it was confirmed that the positive active material with the concentration of the metal composition had a good crystalline layered compound.

Coin cells including positive active materials prepared in accordance with procedures according to Examples 1 to 4 and Comparative Example 1 were evaluated at a range of from 3.0 to 4.3 volts and an applying current of 0.4 mA in an electrochemical analysis device (Togo System, Toscat 3100U) to determine the discharge capacity depending upon the cycle. Herein, the results for Comparative Example 1 and Example 1 are shown in FIG. 6. $Li[Ni_{0.8}Co_{0.1}Mn_{0.1}]O_2$ according to Comparative Example 1 showed a 9% capacity decrease in which the initial capacity of 194 mAh/g was decreased to 177 mAh/g when repeating 50 cycles. In contrast, the positive active material $Li([Ni_{0.80}Co_{0.13}Mn_{0.07}]_{0.6}[Ni_{0.4}Co_{0.4}Mn_{0.2}]_{0.4})O_2$ electrode having a concentration gradient according to Example 1 showed a 2% capacity decrease in which the initial capacity of 177 mAh/g was decreased to 174 mAh/g when repeating 46 cycles. The results were caused by the external bulk part preventing the internal bulk part from reacting with electrolyte solution, differing from the surface reaction of Comparative Example 1.

FIG. 7 shows data of differential thermogravimetric analysis for each positive active material of cells according to Example 1 and Comparative Example 1 that were fully charged $Li[Ni_{0.80}Co_{0.1}Mn_{0.1}]O_2$ according to Comparative Example 1 began to emit heat and had a main exothermal peak at 220° C. On the other hand, the positive active material $Li([Ni_{0.80}Co_{0.13}Mn_{0.07}]_{0.6}[Ni_{0.4}Co_{0.4}Mn_{0.2}]_{0.4})O_2$ having a concentration gradient according to Example 1 began to emit heat at 240° C., which was 50° C. higher than when the $Li[Ni_{0.80}Co_{0.1}Mn_{0.1}]O_2$ according to Comparative Example, and began to emit heat and had a main exothermal peak at 249° C. The result showed that the external bulk part remarkably improved the thermal stability of the internal bulk part in the positive active material having a concentration gradient.

FIG. 8 shows the discharge capacity depending upon the cycle of each positive active material fabricated from Comparative Example 1 and Example 2. The charge and discharge test conditions were the same as for Example 1. When the positive active material according to Comparative Example 1 was repeated for 50 cycles, the discharge capacity was maintained at a 94% level comparing to the initial capacity. On contrast, the positive active material $Li([Ni_{0.80}Co_{0.1}Mn_{0.0}]_{0.7}[Ni_{0.5}Co_{0.2}Mn_{0.3}]_{0.3})O_2$ electrode having a concentration gradient according to Example 2 had a slightly lower initial capacity of 178 mAh/g, but had an excellent cycle characteristic of 98% after repeating 50 cycles.

FIG. 9 shows a data graph of differential thermogravimetric analysis for each positive active material according to Comparative Example 1 and Example 2 after being fully charged at 4.3V. As describing in FIG. 7, $Li[Ni_{0.8}Co_{0.1}Mn_{0.1}]O_2$ emitted heat at 190° C. and had a main exothermal peak at 220° C., and in contrast, the positive active material $Li([Ni_{0.80}Co_{0.1}Mn_{0.1}]_{0.7}[Ni_{0.5}Co_{0.2}Mn_{0.3}]_{0.3})O_2$ having a concentration gradient started to emit heat at 240° C. which was 50° C. higher than Li[Ni0.8Co0.1Mn0.1]O2 according to Comparative Example 1 and had a main exothermal peak at 250° C. Differing from the positive active material having a concentration gradient according to Example 1, the exothermal volume was remarkably decreased in the positive active material according to Example 2. The reason is that the external bulk part had a stable structure and a low Ni amount and was densely filled so that the contact of the internal bulk part with the electrolyte solution was prevented to improve the thermal stability when the positive active material had a concentration gradient.

FIG. 10 shows differential thermogravimetric analysis data for the positive active material of cells including positive active materials according to Comparative Example 1 and Example 3 that were fully charged at 4.3V. $Li[Ni_{0.8}Co0.1Mn0.1]O2$ started to emit heat at 190° C. and had a main exothermal peak at 220° C. In contrast, the positive active material $Li([Ni_{0.8}Co_{0.1}Mn_{0.1}]_{0.7}[Ni_{0.475}Co_{0.05}Mn_{0.475}]_{0.3})O_2$ having a concentration gradient according to Example 3 started to emit heat at 250° C. which was 60° C. higher than that of $Li[Ni_{0.8}Co_{0.1}Mn_{0.1}]O_2$ according to Comparative Example 1 and had a main exothermal peak of 260° C. The positive active material according to Example 3 had more thermal stability than that of Example 1 because the external bulk part of that according to Example 3 had more thermal stability than that of Example 1.

Embodiments in the Case that Sizes of Particles are Uniform and Volumes of Internal Bulk Parts are Different from Each Other Embodiment Example 5

4 liters of distilled water were introduced into a co-precipitation reactor (a capacity of 4 L, a rotating motor output of 80 W or more) and a nitrogen gas was then supplied into the reactor at a rate of 0.5 liter/min to remove dissolved oxygen. The distilled water and the nitrogen gas were agitated in the reactor at 1000 rpm while maintaining a reactor temperature of 50° C.

A 2.4 M metal aqueous solution in which nickel sulfate, cobalt sulfate, and manganese sulfate were mixed at a molar ratio of 95:0:5 was continuously added into the reactor at a rate of 0.3 liter/hour, and a 4.8 mole ammonia solution was also continuously added into the reactor at a ratio of 0.03 liter/hour. In addition, a 4.8 mole hydroxide sodium solution was added to the reactor, so a pH of the solutions was maintained at 11.

The speed of an impeller was controlled to 1000 rpm. Flow rates of the solutions were controlled to retain the solutions for 6 hours on average. After the reaction reached a steady state, the reactant was continued for a predetermined retaining time on the steady state to obtain a denser composite metal hydroxide.

When a particle size (e.g., a radius) of the composite metal hydroxide reached at the steady state became 4.3 µm, the capacity of the metal aqueous solution including nickel sulfate, cobalt sulfate, and manganese sulfate was kept at 4 liters. Thereafter, the reaction was continued while the molar ratio of nickel sulfate, cobalt sulfate, and manganese sulfate of the metal aqueous solution was changed from 95:0:5 to 50:20:30. Thus, a volume of an internal bulk part became 35% of a total volume of the particle and a thickness of an external bulk part became 1.7 µm.

When the molar ratio of the metal aqueous solution reached 50:20:30, the reaction was continued at this molar ratio until reaching the steady state, thereby obtaining a spherical nickel-manganese-cobalt composite hydroxide having a concentration gradient. The metal composite hydroxide was filtered and cleaned with water. The cleaned metal composite hydroxide was dried at 110° C. for 15 hours by a warm-air dryer.

The metal composite hydroxide and lithium hydroxide (LiOH) were mixed at a molar ratio of 1:1.07. The mixture of the metal composite hydroxide and LiOH and were heated at a heating ratio of 2° C./min. Thereafter, the mixture of the metal composite hydroxide and LiOH was maintained at 500° C. for 10 hours by a preliminary firing process. Next, the mixture was fired at 780° C. for 20 hours to obtain a positive active material having an internal bulk part composed of Li[Ni$_{0.95}$Mn$_{0.05}$]O$_2$ and an external bulk part having a continuous uniform concentration gradient from Li[Ni$_{0.95}$Mn$_{0.05}$]O$_2$ to Li[Ni$_{0.5}$Co$_{0.2}$Mn$_{0.3}$]O$_2$.

Embodiment Example 6

A positive active material particle was prepared to include an internal bulk part having a size of 4.7 μm, and an external bulk part having a thickness of 1.3 μm. Thus, the internal bulk part accounted for 50% of the total volume of the positive active material particle. With the exception of these features, the positive active material particle of the embodiment example 6 was prepared in accordance with the same processes as in the embodiment example 5.

Comparative Example 3

A positive active material particle was prepared to include an internal bulk part having a size of 3.5 μm and an external bulk part having a thickness of 2.5 μm. Thus, the internal bulk part accounted for 20% of the total volume of the positive active material particle. With the exception of these features, the positive active material particle of the Comparative example 3 was prepared in accordance with the same procedure as in the embodiment example 5.

Embodiment Example 7

An internal bulk part having a size 5.3 μm was formed using a 2.4 mole metal aqueous solution in which nickel sulfate, cobalt sulfate, and manganese sulfate were mixed at a molar ratio of 80:10:10, and an external bulk part having a thickness of 0.7 μm was formed using a 2.4 mole metal aqueous solution in which nickel sulfate, cobalt sulfate, and manganese sulfate were mixed at a molar ratio of 55:15:30. With the exception of these features, the positive active material particle of the embodiment example 3 was prepared in accordance with the same procedure as in the embodiment example 5.

Embodiment Example 8

A positive active material particle was prepared to include an internal bulk part having a size of 5.7 μm and an external bulk part having a thickness of 0.3 μm. With the exception of these features, the positive active material particle of the embodiment example 8 was prepared in accordance with the same processes as in the embodiment example 3.

Comparative Example 4

A positive active material particle of the Comparative example 4 was prepared to have the molar ratio of nickel, cobalt, and manganese that was fixed at 80:10:10 throughout the particle.

[Concentration Change Rate in External Bulk Part]

Concentration change rates in the external bulk parts of the embodiment examples 5 to 8 and the Comparative examples 3 and 4 are shown in the following table 1.

TABLE 2

| | Internal bulk part | | | | External bulk part | | | | Concentration change rate in external bulk part (mol %/0.1 μm) | | |
|---|---|---|---|---|---|---|---|---|---|---|---|
| | Ni (mole %) | Co (mole %) | Mn (mole %) | Radius (μm) | Ni (mole %) | Co (mole %) | Mn (mole %) | Thickness (μm) | Ni | Co | Mn |
| Embodiment example 5 | 95 | 0 | 5 | 4.3 | 50 | 20 | 30 | 1.7 | 2.65 | 1.18 | 1.47 |
| Embodiment example 6 | 90 | 0 | 5 | 4.7 | 50 | 20 | 30 | 1.3 | 3.08 | 1.54 | 1.92 |
| Comparative example 3 | 95 | 0 | 5 | 3.5 | 50 | 20 | 30 | 2.5 | 1.8 | 0.8 | 1.0 |
| Embodiment example 7 | 80 | 10 | 10 | 5.3 | 55 | 15 | 30 | 0.7 | 5 | 0.7 | 2.85 |
| Embodiment example 8 | 80 | 5 | 15 | 5.7 | 40 | 20 | 40 | 0.3 | 13.3 | 5 | 8.3 |
| Comparative example 4 | 80 | 10 | 10 | 6.0 | 80 | 10 | 10 | 0 | 0 | 0 | 0 |

[Preparation of Lithium Rechargeable Cell]

Each of the positive active material prepared according to the embodiment examples 5 to 8 and the comparative examples 3 and 4, acetylene black used as a conductive agent, and polyvinylidene fluoride (PVdF) used as a coupling agent were mixed at a ratio of 80:10:10 to prepare slurry. The slurry was uniformly coated on aluminum foil having a thickness of 20 μm, and the aluminum foil coated with the slurry was vacuum-dried at 120° C. to fabricate a positive electrode for a lithium rechargeable cell.

A coin cell was fabricated to include each of the positive electrodes, lithium foil, a separator, and a liquid electrolytic solution by a commonly known fabrication process. The lithium foil was used as a counter electrode, and a porous polyethylene layer (manufactured by Celgard LLC, Celgard 2300, thickness: 25 μm) was used as the separator. LiPF$_6$ of 1 mole concentration was dissolved in a solvent obtained by mixing ethylene carbonate and diethyl carbonate at a volume ratio of 1:1, thereby preparing the liquid electrolytic solution.

[Experiment Example] Measurement of Characteristic of Cell (Discharge Capacity Measurement)

The coin cells including the positive active materials prepared according to the embodiment examples 5 to 8 and the comparative examples 3 and 4 were evaluated at a range of 3.0 volts to 4.3 volts by an electrochemical analysis apparatus (Togo System, Toscat 3100U) to measure their discharge capacities according to a cycle. Here, an applying current was 0.4 mA. The measured results are shown in FIGS. 11 to 13 and the following table 3.

[Experiment Example] Measurement of Lifetime Characteristic

Lifetime characteristics of the coin cells including positive active materials prepared according to the embodiment examples 5 to 8 and the comparative examples 3 and 4 were measured. The measured results are shown in FIGS. 11 to 13 and the following table 3.

[Experiment Example] Measurement of DSC Characteristic

DSC characteristics of the coin cells including positive active materials prepared according to the embodiment examples 5 to 8 and the comparative examples 3 and 4 were measured. The measured results are shown in FIGS. 11 to 13 and the following table 3.

TABLE 3

| | Discharge capacity (mAh/g) | Lifetime characteristic ($100^{th}$, %) | Thermal stability (DSC, ° C.) |
|---|---|---|---|
| Embodiment example 5 | 208.4 | 92.7 | 270.3 |
| Embodiment example 6 | 207.3 | 93.1 | 274.9 |
| Embodiment example 7 | 201.9 | 93.7 | 276.3 |
| Embodiment example 8 | 204.1 | 94.1 | 280.1 |
| Comparative example 3 | 198.7 | 93.5 | 277.8 |
| Comparative example 4 | 203.1 | 79.7 | 232.2 |

Embodiments in the Case that Volumes of Internal Bulk Parts are Uniform and Total Sizes of Particles are Different from Each Other Embodiment Example 9

4 L of distilled water were introduced into a co-precipitation reactor (a capacity of 4 L, a rotating motor output of 80 W or more) and a nitrogen gas was then supplied into the reactor at a rate of 0.5 liter/min to remove dissolved oxygen. The distilled water and the nitrogen gas were agitated in the reactor at 1000 rpm while maintaining a reactor temperature of 50° C.

A 2.4 M metal aqueous solution in which nickel sulfate, cobalt sulfate, and manganese sulfate were mixed at a molar ratio of 95:5:5 was continuously added into the reactor at a rate of 0.3 liter/hour, and a 4.8 mole ammonia solution was also continuously added into the reactor at a ratio of 0.03 liter/hour. In addition, a 4.8 mole hydroxide sodium solution was added to the reactor, so a pH of the solutions was maintained at 11.

The speed of an impeller was controlled to 1000 rpm. Flow rates of the solutions were controlled to retain the solutions for 6 hours on average. After the reaction reached a steady state, the reactant was continued for a predetermined retaining time on the steady state to obtain a denser composite metal hydroxide.

When a particle size (a radius) of the composite metal hydroxide reached at the steady state became 4.5 µm, the capacity of the metal aqueous solution including nickel sulfate, cobalt sulfate, and manganese sulfate was kept at 4 liters. Thereafter, the reaction was continued while the molar ratio of nickel sulfate, cobalt sulfate, and manganese sulfate of the metal aqueous solution was changed from 95:5:5 to 60:15:25. Thus, a volume of an internal bulk part became 35% of a total volume of the particle and a thickness of an external bulk part became 1.9 µm.

When the molar ratio of the metal aqueous solution reached 60:15:25, the reaction was continued at this molar ratio until reaching the steady state, thereby obtaining a spherical nickel-manganese-cobalt composite hydroxide having a concentration gradient. The metal composite hydroxide was filtered and cleaned with water. The cleaned metal composite hydroxide was dried at 110° C. for 15 hours by a warm-air dryer.

The metal composite hydroxide and lithium hydroxide (LiOH) were mixed at a molar ratio of 1:1.07. The mixture of metal composite hydroxide and (LiOH) was heated at a heating ratio of 2° C./min. Thereafter, the mixture of the metal composite hydroxide and LiOH was maintained at 500° C. for 10 hours by a preliminary firing process. Next, the mixture was fired at 780° C. for 20 hours to obtain a positive active material having an internal bulk part composed of $Li[Ni_{0.90}Co_{0.05}Mn_{0.05}]O_2$ and an external bulk part having a continuous uniform concentration gradient from $Li[Ni_{0.90}Co_{0.05}Mn_{0.05}]O_2$ to $Li[Ni_{0.6}Co_{0.15}Mn_{0.25}]O_2$).

Embodiment Example 10

An internal bulk part was composed of $Li[Ni_{0.85}Co_{0.05}Mn_{0.10}]O_2$, and an external bulk part had a continuous concentration gradient from $Li[Ni_{0.85}Co_{0.05}Mn_{0.10}]O_2$ to $Li[Ni_{0.55}Co_{0.15}Mn_{0.30}]O_2$. A size of the internal bulk part was 4.5 µm, and a thickness of the external bulk part was 1.2 µm. Thus, the internal bulk part accounted for 50% of the total volume of the positive active material particle. With the exception of these features, the positive active material particle of the embodiment example 10 was prepared in accordance with the same processes as in the embodiment example 5.

Embodiment Example 11

An internal bulk part was composed of $Li[Ni_{0.80}Co_{0.10}Mn_{0.10}]O_2$, and an external bulk part had a continuous concentration gradient from $Li[Ni_{0.80}Co_{0.10}Mn_{0.10}]O_2$ to $Li[Ni_{0.50}Co_{0.20}Mn_{0.30}]O_2$. A radius of the internal bulk part was 4.5 µm, and a thickness of the external bulk part was 0.6 µm. Thus, the internal bulk part accounted for 70% of the total volume of the positive active material particle. With the exception of these features, the positive active material particle of the embodiment example 11 was prepared in accordance with the same processes as in the embodiment example 5.

Embodiment Example 12

An internal bulk part was composed of $Li[Ni_{0.80}Co_{0.10}Mn_{0.10}]O_2$, and an external bulk part had a continuous concentration gradient from $Li[Ni_{0.80}Co_{0.10}Mn_{0.10}]O_2$ to $Li[Ni_{0.50}Co_{0.20}Mn_{0.30}]O_2$. A radius of the internal bulk part was 4.5 μm, and a thickness of the external bulk part was 0.4 μm. Thus, the internal bulk part accounted for 80% of the total volume of the positive active material particle. With the exception of these features, the positive active material particle of the embodiment example 12 was prepared in accordance with the same processes as in the embodiment example 5.

Embodiment Example 13

An internal bulk part was composed of Li[Ni$_{0.75}$Co$_{0.10}$Mn$_{0.15}$]O$_2$, and an external bulk part had a continuous concentration gradient from Li[Ni$_{0.75}$Co$_{0.10}$Mn$_{0.15}$]O$_2$ to Li[Ni$_{0.40}$Co$_{0.20}$Mn$_{0.40}$]O$_2$. A radius of the internal bulk part was 4.5 μm, and a thickness of the external bulk part was 0.2 μm. Thus, the internal bulk part accounted for 90% of the total volume of the positive active material particle. With the exception of these features, the positive active material particle of the embodiment example 13 was prepared in accordance with the same processes as in the embodiment example 5.

Comparative Example 5

A radius of the internal bulk part was 4.5 μm, and a thickness of the external bulk part was 2.6 μm. Thus, the internal bulk part accounted for 25% of the total volume of the positive active material particle. With the exception of these features, the positive active material particle of the Comparative example 5 was prepared in accordance with the same processes as in the embodiment example 11.

Comparative Example 6

A positive active material particle of the Comparative example 6 was prepared to have the molar ratio of nickel, cobalt, and manganese that was fixed at 80:10:10 throughout the particle.

Embodiments in the Case that Radius of Internal Bulk Parts are Constant at 5.5 μm Embodiment Example 14

An internal bulk part was composed of Li[Ni$_{0.85}$Co$_{0.05}$Mn$_{0.10}$]O$_2$ and an external bulk part had a continuous concentration gradient from Li[Ni$_{0.85}$Co$_{0.05}$Mn$_{0.10}$]O$_2$ to Li[Ni$_{0.50}$Co$_{0.20}$Mn$_{0.30}$]O$_2$. A radius of the internal bulk part was 5.5 μm, and a thickness of the external bulk part was 1.7 μm. Thus, the internal bulk part accounted for 45% of the total volume of the positive active material particle. With the exception of these features, the positive active material particle of the embodiment example 10 was prepared in accordance with the same processes as in the embodiment example 5.

Embodiment Example 15

An internal bulk part was composed of Li[Ni$_{0.85}$Co$_{0.05}$Mn$_{0.10}$]O$_2$ and an external bulk part had a continuous concentration gradient from Li[Ni$_{0.85}$Co$_{0.05}$Mn$_{0.10}$]O$_2$ to Li[Ni$_{0.50}$Co$_{0.20}$Mn$_{0.30}$]O$_2$. A radius of the internal bulk part was 5.5 μm, and a thickness of the external bulk part was 0.3 μm. Thus, the internal bulk part accounted for 85% of the total volume of the positive active material particle. With the exception of these features, the positive active material particle of the embodiment example 15 was prepared in accordance with the same processes as in the embodiment example 5.

Comparative Example 7

A positive active material particle of the Comparative example 6 was prepared to have the molar ratio of nickel, cobalt, and manganese that was fixed at 85:05:10 throughout the particle.

[Concentration Change Rate in External Bulk Part]

Concentration change rates in the external bulk parts of the embodiment examples 9 to 13 and the Comparative examples 5 to 6 are shown in the following table 4.

TABLE 4

| | Internal bulk part | | | | External bulk part | | | | Concentration change rate in external bulk part | | |
|---|---|---|---|---|---|---|---|---|---|---|---|
| | Ni (mole %) | Co (mole %) | Mn (mole %) | Radius (μm) | Ni (mole %) | Co (mole %) | Mn (mole %) | Thickness (μm) | Ni | Co | Mn |
| Embodiment example 9 | 90 | 5 | 5 | 4.5 | 60 | 15 | 25 | 1.9 | 2.11 | 0.53 | 1.05 |
| Embodiment example 10 | 85 | 5 | 10 | 4.5 | 55 | 15 | 30 | 1.2 | 2.92 | 0.83 | 1.67 |
| Embodiment example 11 | 80 | 10 | 10 | 4.5 | 50 | 20 | 30 | 0.6 | 5 | 1.67 | 0.33 |
| Embodiment example 12 | 80 | 10 | 10 | 4.5 | 50 | 20 | 30 | 0.4 | 7.5 | 2.5 | 5 |
| Embodiment example 13 | 75 | 10 | 15 | 4.5 | 40 | 20 | 40 | 0.2 | 17 | 5 | 12.5 |
| Comparative example 5 | 80 | 10 | 10 | 4.5 | 50 | 20 | 30 | 2.6 | 1.15 | 0.38 | 0.77 |
| Comparative example 6 | 80 | 10 | 10 | 4.5 | 80 | 10 | 10 | 0 | 0 | 0 | 0 |
| Embodiment example 14 | 85 | 5 | 10 | 5.5 | 50 | 20 | 30 | 1.7 | 2.06 | 0.8 | 1.18 |
| Embodiment example 115 | 85 | 5 | 10 | 5.5 | 50 | 20 | 30 | 0.3 | 11.67 | 5 | 6.67 |
| Comparative example 7 | 85 | 5 | 10 | 5.5 | 85 | 5 | 10 | 0 | 0 | 0 | 0 |

[Preparation of Lithium Rechargeable Cell]

Each of the positive active material prepared according to the embodiment examples 9 to 15 and the Comparative examples 5 to 7, acetylene black used as a conductive agent, and polyvinylidene fluoride (PVdF) used as a coupling agent were mixed at a ratio of 80:10:10 to prepare slurry. The slurry was uniformly coated on aluminum foil having a thickness of 20 μm, and the aluminum foil coated with the slurry was vacuum-dried at 120° C. to fabricate a positive electrode for a lithium rechargeable cell.

A coin cell was fabricated to include each of the positive electrodes, lithium foil used as a counter electrode, a separator, and a liquid electrolytic solution by a commonly known fabrication process. A porous polyethylene layer (manufactured by Celgard LLC, Celgard 2300, thickness: 25 μm) was used as the separator. $LiPF_6$ of 1 mole concentration was dissolved in a solvent having ethylene carbonate and diethyl carbonate that were mixed at a volume ratio of 1:1, thereby preparing the liquid electrolytic solution.

[Experiment Example] Measurement of Characteristic of Cell (Measurement of Discharge Capacity)

The coin cells including the positive active materials prepared according to the embodiment examples 9 to 15 and the Comparative examples 5 to 7 were evaluated at a range of 3.0 volts to 4.3 volts by an electrochemical analysis apparatus (Toyo System, Toscat 3100U) to measure their discharge capacities depending on a cycle. Here, an applying current was 0.4 mA. The measured results are shown in FIGS. 14 to 17 and the following table 5.

TABLE 5

| | Discharge capacity (mAh/g) | Lifetime characteristic ($100^{th}$, %) | Thermal stability (DSC, ° C.) |
|---|---|---|---|
| Embodiment example 9 | 208.0 | 90.9 | 265.3 |
| Embodiment example 10 | 203.5 | 93.6 | 272.1 |
| Embodiment example 11 | 200.1 | 92.8 | 275.7 |
| Embodiment example 12 | 203.1 | 92.3 | 271.5 |
| Embodiment example 13 | 197.5 | 94.7 | 281.6 |
| Embodiment example 14 | 199.3 | 93.5 | 273.5 |
| Embodiment example 15 | 210.8 | 91.9 | 270.7 |
| Comparative example 5 | 191.2 | 92.1 | 266.2 |
| Comparative example 6 | 202.9 | 77.7 | 229.5 |
| Comparative example 7 | 206.4 | 67.5 | 223.9 |

[Experiment Example] Measurement of Lifetime Characteristic

Lifetime characteristics of the coin cells including the positive active materials prepared according to the embodiment examples 9 to 15 and the Comparative examples 5 to 7 were measured. The measured results are shown in FIGS. 14 to 17 and the above table 5.

[Experiment Example] Measurement of DSC Characteristic

DSC characteristics of the coin cells including the positive active materials prepared according to the embodiment examples 9 to 15 and the Comparative examples 5 to 7 were measured. The measured results are shown in FIGS. 14 to 17 and the above table 4.

As described above, the positive active material includes the internal bulk part formed using a hydration co-precipitation method and the external bulk part having the continuous concentration gradient of the metal composition. The internal bulk part is composed of the nickel-based positive active material having the high capacity, and the external bulk part that is in contact with an electrolyte is composed of the nickel-based or ternary ($Li[Ni_xCo_{1-2x}Mn_x]O_2$) laminated positive active material having high stability. Thus, the lifetime characteristic and the thermal stability of the positive active material are excellent.

While the present invention has been described with reference to example embodiments, it will be apparent to those skilled in the art that various changes and modifications may be made without departing from the spirits and scopes of the present invention. Therefore, it should be understood that the above embodiments are not limiting, but illustrative. Thus, the scopes of the present invention are to be determined by the broadest permissible interpretation of the following claims and their equivalents, and shall not be restricted or limited by the foregoing description.

What is claimed is:

1. A positive active material for a lithium battery comprising: an internal bulk part comprising at least two metals selected from the group consisting of nickel, manganese, and cobalt;
    an external bulk part surrounding the internal bulk part and comprising the same at least two metals as the internal part; and
    an interface between the internal bulk part and the external bulk part,
    wherein the internal bulk part extends from a center of the positive active material to the interface, and the external bulk part extends from the interface to a surface of the positive active material,
    wherein,
    each of the at least two metals in the internal bulk part and the interface has a constant concentration,
    each of the at least two metals in the external bulk part has a continuous concentration gradient starting from the same concentration as each of the at least two metals in the internal bulk part and the interface toward the surface of the positive active material,
    a concentration change rate of each of the at least two metals from the interface to the surface of the positive active material is in a range of 0.1 mol %/0.1 μm to 50 mol %/0.1 μm, and
    wherein a concentration of nickel decreases, and a concentration of each of manganese and cobalt increases from the interface to the surface of the positive active material.

2. The positive active material of claim 1, wherein the concentration change rate of each of the at least two metals from the interface to the surface of the positive active material is in a range of 0.1 mol %/0.1 μm to 20 mol %/0.1 μm.

3. The positive active material of claim 1,
    wherein
    the internal bulk part comprises nickel and cobalt,
    the concentration change rate of nickel in the external bulk part is in a range of 2 mol %/0.1 μm to 20 mol %/0.1 μm, and the concentration change rate of cobalt in the external bulk part is in a range of 0.1 mol %/0.1 μm to 10 mol %/0.1 μm.

4. The positive active material of claim 3, further comprising manganese in the internal bulk part, wherein the concentration change rate of nickel, the concentration change rate of cobalt, and a concentration change rate of manganese in the external bulk part satisfy the following relation formulas 1 and 2:

$$M_{Ni} \geq M_{Co}$$ [Relation formula 1]

$$M_{Ni} \geq M_{Mn}, \text{ and}$$ [Relation formula 2]

wherein $M_{Ni}$ is the concentration change rate of nickel, $M_{Co}$ is the concentration change rate of cobalt, and $M_{Mn}$ is the concentration change rate of manganese.

5. The positive active material of claim 1, wherein a concentration of a metal in a surface portion of the external bulk part is at least 5% more than a concentration of the metal in the internal bulk part.

6. The positive active material of claim 1, wherein the internal bulk part comprises a high-capacity compound including nickel, cobalt, and manganese, and the external bulk part comprises a compound including nickel and manganese and having excellent thermal stability.

7. The positive active material of claim 1, wherein the internal bulk part comprises a lithium-containing compound expressed by the following chemical formula 1,
wherein the external bulk part includes one selected from a group consisting of a material expressed by the following chemical formula 2, a material expressed by the following chemical formula 3, and a mixture thereof, $$Li_aNi_{1-x-y-z}Co_xMn_yM_zO_{2-\delta}X_\delta$$ [Chemical formula 1]

wherein, in the chemical formula 1, $0.95 \leq a \leq 1.2$, $0.01 \leq x \leq 0.5$, $0.01 \leq y \leq 0.5$, $0.005 \leq z \leq 0.3$, $0.05 \leq x+y+z \leq 0.4$, M is at least one element selected from a group consisting of Mg, Al, Cr, V, Ti, Cr, Fe, Zr, Zn, Si, Y, Nb, Ga, Sn, Mo, W, and combinations thereof, X is a halogen of F, Cl, Br, or I, and $0 \leq \delta \leq 0.1$, $$Li_aNi_{1-x-y-z}Co_xMn_yM_zO_{2-\delta}X_\delta$$ [Chemical formula 2]

wherein, in the chemical formula 2, $0.95 \leq a \leq 1.2$, $0.01 \leq x \leq 0.4$, $0.01 \leq y \leq 0.5$, $0.002 \leq z \leq 0.2$, $0.4 < x+y+z \leq 0.95$, M is at least one element selected from a group consisting of Mg, Al, Cr, V, Ti, Cr, Fe, Zr, Zn, Si, Y, Nb, Ga, Sn, Mo, W, and combinations thereof, X is a halogen of F, Cl, Br, or I, and $0 \leq \delta \leq 0.1$, and $$Li_aNi_xCo_{1-2x}Mn_{x-y}M_yO_{2-\delta}X_\delta$$ [Chemical formula 3]

wherein, in the chemical formula 3, $0.95 \leq a \leq 1.2$, $0.01 \leq x \leq 0.5$, $0 \leq y \leq 0.1$, M is at least one element selected from the group consisting of Mg, Al, Cr, V, Ti, Cr, Fe, Zr, Zn, Si, Y, Nb, Ga, Sn, Mo, W, and combinations thereof, X is a halogen of F, Cl, Br, or I, and $0 \leq \delta \leq 0.1$.

8. The positive active material of claim 1, wherein an average particle diameter of the internal bulk part is in a range of 4 μm 15 μm, and an average particle diameter of particles of the positive active material is in a range of 9 μm to 30 μm.

* * * * *